United States Patent
Johnson et al.

(10) Patent No.: US 10,055,603 B2
(45) Date of Patent: *Aug. 21, 2018

(54) ELECTRONIC DOCUMENT MANAGEMENT AND DELIVERY

(71) Applicant: Parchment Inc., Scottsdale, AZ (US)

(72) Inventors: Jay A. Johnson, Conifer, CO (US); Mark R. Johnston, Castle Rock, CO (US); Ronald M. Hyman, Hopedale, MA (US); Chris M. Kaschmitter, Littleton, CO (US)

(73) Assignee: Parchment Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/164,713

(22) Filed: May 25, 2016

(65) Prior Publication Data

US 2016/0267292 A1 Sep. 15, 2016

Related U.S. Application Data

(63) Continuation of application No. 12/817,702, filed on Jun. 17, 2010, now Pat. No. 9,373,002, which is a continuation of application No. 12/602,617, filed as application No. PCT/US2008/060145 on Apr. 11, 2008, now abandoned.

(60) Provisional application No. 60/911,290, filed on Apr. 12, 2007.

(51) Int. Cl.
| | |
|---|---|
| *G06F 17/30* | (2006.01) |
| *G06F 21/62* | (2013.01) |
| *G06F 21/64* | (2013.01) |
| *G06Q 10/10* | (2012.01) |
| *G06Q 30/06* | (2012.01) |
| *G06Q 30/04* | (2012.01) |

(52) U.S. Cl.
CPC .... *G06F 21/6218* (2013.01); *G06F 17/30011* (2013.01); *G06F 21/645* (2013.01); *G06Q 10/10* (2013.01); *G06Q 30/04* (2013.01); *G06Q 30/0613* (2013.01)

(58) Field of Classification Search
CPC ........... G06F 21/6218; G06F 17/30011; G06F 21/645; G06F 2221/2107; G06F 21/10; G06F 21/62; G06F 21/6209; G06Q 10/10; G06Q 30/0613; H04L 9/3263; H04L 9/3265; H04L 9/3268
USPC .... 726/1, 26–30, 2; 713/193–194, 175, 156, 713/150; 707/609, 661, 665, 694, 705
See application file for complete search history.

(56) References Cited

U.S. PATENT DOCUMENTS

| | | |
|---|---|---|
| 5,748,738 A | 5/1998 | Bisbee et al. |
| 5,781,732 A | 7/1998 | Adams |
| 5,963,649 A | 5/1999 | Sako |

(Continued)

FOREIGN PATENT DOCUMENTS

WO WO 2008/030759 3/2008

OTHER PUBLICATIONS

National Student Clearinghouse's Complaint for Declaratory Judgment of Patent Non-Infringement, Invalidity, and Unenforceability, Filed Nov. 1, 2011, 20 pages.

(Continued)

*Primary Examiner* — Mohammad Waliullah
(74) *Attorney, Agent, or Firm* — Lewis Brisbois Bisggaard & Smith LLP

(57) ABSTRACT

In one embodiment, system to manage and delivery electronic documents is disclosed.

18 Claims, 13 Drawing Sheets

(56) References Cited

U.S. PATENT DOCUMENTS

| | | | |
|---|---|---|---|
| 6,389,402 B1 | 5/2002 | Ginter et al. | |
| 6,516,411 B2 | 2/2003 | Smith | |
| 6,659,038 B2 | 12/2003 | Calcagno | |
| 6,948,657 B2 | 9/2005 | Sugino et al. | |
| 6,973,196 B2 | 12/2005 | Patton et al. | |
| 6,988,199 B2 | 1/2006 | Toh et al. | |
| 7,043,453 B2 | 5/2006 | Stefik et al. | |
| 7,089,583 B2 | 8/2006 | Mehra et al. | |
| 7,099,849 B1 | 8/2006 | Reeder et al. | |
| 7,133,845 B1 | 11/2006 | Ginter et al. | |
| 7,277,925 B2 | 2/2007 | Warnock | |
| 7,188,138 B1 | 3/2007 | Schneider | |
| 7,197,161 B2 | 3/2007 | Fan | |
| 7,206,765 B2 | 4/2007 | Gilliam et al. | |
| 7,206,941 B2 * | 4/2007 | Raley et al. | 713/193 |
| 7,237,114 B1 | 6/2007 | Rosenberg | |
| 7,237,144 B2 | 6/2007 | Safford et al. | |
| 7,278,168 B1 * | 10/2007 | Chaudhury et al. | 726/30 |
| 7,302,634 B2 | 11/2007 | Lucovsky et al. | |
| 7,353,541 B1 | 1/2008 | Ishibashi et al. | |
| 7,340,058 B2 | 3/2008 | Jakobsson et al. | |
| 7,328,245 B1 | 5/2008 | Hull et al. | |
| 7,392,395 B2 | 6/2008 | Ginter et al. | |
| 7,587,369 B2 | 9/2009 | Ginter et al. | |
| 7,596,689 B2 | 9/2009 | Toh et al. | |
| 7,660,981 B1 | 2/2010 | Hunt | |
| 7,665,141 B2 | 2/2010 | Young | |
| 7,725,723 B2 | 5/2010 | Landrock et al. | |
| 7,743,259 B2 | 6/2010 | Raley et al. | |
| 7,769,712 B2 | 8/2010 | Waldo et al. | |
| 7,660,902 B2 | 9/2010 | Graham et al. | |
| 7,676,568 B2 | 9/2010 | Day | |
| 7,793,106 B2 | 9/2010 | Bugbee | |
| 8,051,289 B2 | 11/2011 | Johnson et al. | |
| 8,103,634 B2 * | 1/2012 | Saito | 707/661 |
| 9,373,002 B2 | 6/2016 | Johnson et al. | |
| 2002/0023140 A1 * | 2/2002 | Hile et al. | 709/217 |
| 2002/0052896 A1 * | 5/2002 | Streit et al. | 707/517 |
| 2002/0087861 A1 | 7/2002 | Segev et al. | |
| 2002/0095389 A1 | 7/2002 | Gaines | |
| 2002/0128844 A1 | 9/2002 | Wilson et al. | |
| 2002/0143818 A1 | 10/2002 | Roberts et al. | |
| 2003/0187798 A1 | 2/2003 | McKinley et al. | |
| 2003/0028494 A1 | 6/2003 | King et al. | |
| 2003/0182234 A1 | 9/2003 | Degroot | |
| 2003/0070072 A1 | 10/2003 | Nassiri | |
| 2003/0233563 A1 | 12/2003 | Kruse | |
| 2004/0039704 A1 | 2/2004 | Gilliam et al. | |
| 2004/0054893 A1 * | 3/2004 | Ellis | 713/165 |
| 2004/0123111 A1 | 6/2004 | Makita et al. | |
| 2004/0133793 A1 | 7/2004 | Ginter et al. | |
| 2004/0220815 A1 | 11/2004 | Belanger et al. | |
| 2004/0237035 A1 | 11/2004 | Cummins | |
| 2005/0027568 A1 | 2/2005 | Dorris | |
| 2005/0054893 A1 | 3/2005 | Ellis | |
| 2005/0080682 A1 * | 4/2005 | Wilson | 705/26 |
| 2005/0182821 A1 * | 8/2005 | Chan et al. | 709/207 |
| 2005/0229258 A1 | 10/2005 | Pigin | |
| 2005/0262339 A1 | 11/2005 | Fischer | |
| 2005/0288939 A1 | 12/2005 | Peled et al. | |
| 2006/0039304 A1 | 2/2006 | Singer et al. | |
| 2006/0095831 A1 * | 5/2006 | Kawada et al. | 715/500 |
| 2006/0180658 A1 | 8/2006 | Anderson et al. | |
| 2006/0282661 A1 | 12/2006 | True et al. | |
| 2007/0006322 A1 | 1/2007 | Karimzadeh et al. | |
| 2007/0038859 A1 | 2/2007 | Tadayon et al. | |
| 2007/0074270 A1 | 3/2007 | Meehan et al. | |
| 2007/0118735 A1 | 5/2007 | Cherrington et al. | |
| 2007/0124584 A1 * | 5/2007 | Gupta | 713/168 |
| 2007/0192140 A1 | 8/2007 | Gropper | |
| 2007/0192609 A1 | 8/2007 | Yoshioka et al. | |
| 2007/0220614 A1 | 9/2007 | Ellis et al. | |
| 2007/0226488 A1 | 9/2007 | Lin et al. | |
| 2007/0289022 A1 | 12/2007 | Wittkotter | |
| 2008/0005024 A1 | 1/2008 | Kirkwood | |
| 2008/0066181 A1 | 3/2008 | Haveson et al. | |
| 2008/0091954 A1 | 4/2008 | Morris et al. | |
| 2008/0208873 A1 | 8/2008 | Boehmer | |
| 2008/0235175 A1 * | 9/2008 | Olive | 707/1 |
| 2008/0235236 A1 | 9/2008 | Olive | |
| 2009/0172777 A1 | 7/2009 | Hansen et al. | |
| 2010/0106645 A1 | 4/2010 | Peckover | |
| 2010/0122093 A1 | 5/2010 | Tuyis et al. | |
| 2010/0217988 A1 * | 8/2010 | Johnson | 713/175 |

OTHER PUBLICATIONS

Avow's Notice of Motion and Defendant's Motion to Dismiss for Lack of Personal Jurisdiction Pursuant to FRCP 12(b)(2), Lack of Declaratory Judgment Jurisdiction, Improper Venue Pursuant to FRCP 12(b)(3), or in the Alternative to Transfer Action to the District of Colorado, Filed Dec. 7, 2011, 5 pages.

Berchtold et al., "SaveMe: A system for Archiving Electronic Documents Using Messaging Groupware," AT&T Labs Research, Florham Park, NJ, 1999, available at http://www.biliris.com/alex/pubs/papers/99_saveme_wacc99.pdf.

Delaigle et al., "Digital Watermarking," Proceedings SPIE, Mar. 1996, vol. 2659, p. 99-110, [online publication date Jan. 21, 2005], available at http://citeseerx.ist.psu.edu/viewdoc/download?doi=10.1.1.22.3285&rep=rep1&type=pdf.

Newsletter, National Student Clearinghouse, vol. 12, Winter 2000, pp. 1-5.

PESC DTS, "Data Transport Standard Specification," PESC DTS Technical Workgroup, Oct. 2006, Version 1.01, 43 pages.

Notice of Dismissal with Prejudice, filed Jan. 30, 2012, 2 pages.

Declaration of Jay Johnson in support of Amendment and Response filed Aug. 20, 2012, 2 pages.

"Flow chart diagram from Tier1 Innovation, LLC website, dated Feb. 8, 2006" 2 pages.

International Preliminary Report on Patentability for International (PCT) Patent Application No. PCT/US2008/060145, dated Aug. 29, 2008.

Written Opinion for International (PCT) Patent Application No. PCT/US2008/060145, dated Aug. 29, 2008.

International Search Report for International (PCT) Patent Application No. PCT/US2008/060145, dated Aug. 29, 2008.

Official Action for U.S. Appl. No. 12/602,617, dated Jul. 30, 2012 19 pages.

Official Action for U.S. Appl. No. 12/602,617, dated Mar. 13, 2013 21 pages.

Official Action for U.S. Appl. No. 12/602,617, dated Mar. 24, 2014 21 pages.

Official Action for U.S. Appl. No. 12/602,617, dated Oct. 6, 2014 23 pages.

Official Action for U.S. Appl. No. 12/817,702, dated Apr. 19, 2012 7 pages.

Official Action for U.S. Appl. No. 12/817,702, dated Oct. 19, 2012 13 pages.

Official Action for U.S. Appl. No. 12/817,702, dated Apr. 29, 2013 14 pages.

Official Action for U.S. Appl. No. 12/817,702, dated Jun. 25, 2014 16 pages.

Official Action for U.S. Appl. No. 12/817,702, dated Feb. 6, 2015 22 pages.

Official Action for U.S. Appl. No. 12/817,702, dated Aug. 12, 2015 17 pages.

Notice of Allowance for U.S. Appl. No. 12/817,702, dated Mar. 3, 2016 10 pages.

Official Action for U.S. Appl. No. 12/904,289, dated Jun. 24, 2011 8 pages.

Notice of Allowance for U.S. Appl. No. 12/904,289, dated Sep. 20, 2011 9 pages.

* cited by examiner

```xml
<?xml version="1.0" encoding="UTF-8" ?>
<wsdl:definitions targetNamespace=http://OrderHandler.avow.com
    xmlns="http://schemas.xmlsoap.org/wsdl/" xmlns:apachesoap="http://xml.apache.org/xml-soap"
    xmlns:impl="http://OrderHandler.avow.com" xmlns:intf=http://OrderHandler.avow.com
    xmlns:tns1="http://OrderHandler.avow.com/xsd" xmlns:wsdl=http://schemas.xmlsoap.org/wsdl/
    xmlns:wsdlsoap=http://schemas.xmlsoap.org/wsdl/soap/
    xmlns:xsd="http://www.w3.org/2001/XMLSchema">
  <wsdl:types>
    <schema elementFormDefault="qualified" targetNamespace=http://OrderHandler.avow.com/xsd
      xmlns="http://www.w3.org/2001/XMLSchema">
      <element name="processOrder">
        <complexType>
          <sequence>
            <element name="actionState" type="xsd:string" />
            <element name="oid" type="xsd:string" />
            <element name="opid" type="xsd:string" />
            <element name="param1" type="xsd:string" />
            <element name="param2" type="xsd:string" />
            <element name="param3" type="xsd:string" />
            <element name="securityToken" type="xsd:string" />
          </sequence>
        </complexType>
      </element>
      <element name="processOrderResponse">
        <complexType>
          <sequence>
            <element name="return" type="xsd:string" />
          </sequence>
        </complexType>
      </element>
    </schema>
  </wsdl:types>
  <wsdl:message name="processOrderResponse">
    <wsdl:part element="tns1:processOrderResponse" name="parameters" />
  </wsdl:message>
  <wsdl:message name="processOrderRequest">
    <wsdl:part element="tns1:processOrder" name="parameters" />
  </wsdl:message>
  <wsdl:portType name="OrderHandlerFacadePortType">
    <wsdl:operation name="processOrder">
      <wsdl:input message="impl:processOrderRequest" name="processOrderRequest" />
      <wsdl:output message="impl:processOrderResponse" name="processOrderResponse" />
    </wsdl:operation>
  </wsdl:portType>
  <wsdl:binding name="OrderHandlerFacadeSOAP11portSoapBinding"
      type="impl:OrderHandlerFacadePortType">
    <wsdlsoap:binding style="document" transport="http://schemas.xmlsoap.org/soap/http" />
    <wsdl:operation name="processOrder">
      <wsdlsoap:operation soapAction="urn:processOrder" />
      <wsdl:input name="processOrderRequest">
        <wsdlsoap:body use="literal" />
      </wsdl:input>
      <wsdl:output name="processOrderResponse">
        <wsdlsoap:body use="literal" />
      </wsdl:output>
    </wsdl:operation>
  </wsdl:binding>
  <wsdl:service name="OrderHandlerFacade">
    <wsdl:port binding="impl:OrderHandlerFacadeSOAP11portSoapBinding"
        name="OrderHandlerFacadeSOAP11port">
      <wsdlsoap:address location="https://www.avowsystems.com/OrderHandlerFacadeSOAP11port" />
    </wsdl:port>
  </wsdl:service>
</wsdl:definitions>
```

Fig. 2B

```xml
<?xml version="1.0" encoding="utf-8" ?>
<wsdl:definitions xmlns:soap="http://schemas.xmlsoap.org/wsdl/soap/"
    xmlns:tm="http://microsoft.com/wsdl/mime/textMatching/"
    xmlns:soapenc="http://schemas.xmlsoap.org/soap/encoding/"
    xmlns:mime="http://schemas.xmlsoap.org/wsdl/mime/"
    xmlns:tns="http://tempuri.org/"
    xmlns:s="http://www.w3.org/2001/XMLSchema"
    xmlns:soap12="http://schemas.xmlsoap.org/wsdl/soap12/"
    xmlns:http="http://schemas.xmlsoap.org/wsdl/http/"
    targetNamespace="http://tempuri.org/"
    xmlns:wsdl="http://schemas.xmlsoap.org/wsdl/">
 <wsdl:types>
  <s:schema elementFormDefault="qualified" targetNamespace="http://tempuri.org/">
   <s:element name="DGSMessage">
    <s:complexType>
     <s:sequence>
      <s:element minOccurs="1" maxOccurs="1" name="document_id" type="s:int" />
      <s:element minOccurs="0" maxOccurs="1" name="document_type" type="s:string" />
      <s:element minOccurs="1" maxOccurs="1" name="requestor_id" type="s:int" />
      <s:element minOccurs="0" maxOccurs="1" name="requestor_name" type="s:string" />
      <s:element minOccurs="1" maxOccurs="1" name="requestor_DOB" type="s:dateTime" />
      <s:element minOccurs="0" maxOccurs="1" name="requestor_param1" type="s:string" />
      <s:element minOccurs="0" maxOccurs="1" name="requestor_param2" type="s:string" />
      <s:element minOccurs="0" maxOccurs="1" name="requestor_param3" type="s:string" />
     </s:sequence>
    </s:complexType>
   </s:element>
   <s:element name="DGSMessageResponse">
    <s:complexType>
     <s:sequence>
      <s:element minOccurs="0" maxOccurs="1" name="DGSMessageResult" type="s:string" />
     </s:sequence>
    </s:complexType>
   </s:element>
  </s:schema>
 </wsdl:types>
 <wsdl:message name="DGSMessageSoapIn">
  <wsdl:part name="parameters" element="tns:DGSMessage" />
 </wsdl:message>
 <wsdl:message name="DGSMessageSoapOut">
  <wsdl:part name="parameters" element="tns:DGSMessageResponse" />
 </wsdl:message>
 <wsdl:operation name="DGSMessage">
  <wsdl:input message="tns:DGSMessageSoapIn" />
  <wsdl:output message="tns:DGSMessageSoapOut" />
 </wsdl:operation>
 </wsdl:portType>
 <wsdl:operation name="DGSMessage">
  <soap:operation soapAction="http://tempuri.org/DGSMessage" style="document" />
  <wsdl:input>
   <soap:body use="literal" />
  </wsdl:input>
  <wsdl:output>
   <soap:body use="literal" />
  </wsdl:output>
 </wsdl:operation>
 </wsdl:binding>
 <wsdl:operation name="DGSMessage">
  <soap12:operation soapAction="http://tempuri.org/DGSMessage" style="document" />
  <wsdl:input>
   <soap12:body use="literal" />
  </wsdl:input>
  <wsdl:output>
   <soap12:body use="literal" />
  </wsdl:output>
 </wsdl:operation>
 </wsdl:binding>
 <wsdl:service name="Convert">
  <wsdl:port name="ConvertSoap" binding="tns:ConvertSoap">
   <soap:address location="http://localhost:8080/AvowAlias/Convert.asmx" />
  </wsdl:port>
  <wsdl:port name="ConvertSoap12" binding="tns:ConvertSoap12">
   <soap12:address location="http://localhost:8080/AvowAlias/Convert.asmx" />
  </wsdl:port>
 </wsdl:service>
</wsdl:definitions>
```

ELECTRONIC DOCUMENT MANAGEMENT AND DELIVERY

RELATED APPLICATIONS

This application is a continuation of U.S. patent application Ser. No. 12/817,702, filed Jun. 17, 2010, which is a continuation of U.S. application Ser. No. 12/602,617, filed Dec. 1, 2009, which is a national stage application under 35 U.S.C. 371 of PCT Application No. PCT/US2008/060145 having an International Filing date of Apr. 11, 2008, which designated the United States, which PCT application claimed the benefit of priority under 35 U.S.C. § 119(e) to U.S. Provisional Application No. 60/911,290, entitled Authentic Document Delivery, filed Apr. 12, 2007, the disclosures of each of which are incorporated herein by reference in their entirety.

BACKGROUND

Electronic documents and computer readable files are susceptible to fraud and unauthorized modifications. Electronic documents and computer files can be generated and/or modified by unauthorized and/or unidentified users via many commercially available software programs and/or custom software "hacking" tools available via the internet.

Various entities have devised solutions to reduce the likelihood of this occurring by focusing on encrypting the document or file and/or embedding a digital signature or certificate in the document or file. Existing techniques, individually and/or in combination, have failed to provide allow for the management of the complete document lifecycle (i.e., from creation thru delivery) of secure electronic documents and/or computer files.

SUMMARY

The subject matter described and claimed herein addresses these and other problems to provide a single, integrated solution for the management of a complete and configurable secure document lifecycle process. A messaging framework integrates disparate components and technology enables a seamless flow of data between various technological components in any one of multiple component configurations and across multiple deployment modes.

In one embodiment, the system comprises six modular service components that can be run independently or in combination. The service components include a document ordering service (DOS) module, a document generation service (DGS) module, a document authentication service (DAS) module, a document rights service (DRS) module, a document delivery service (DDS) module, and an Authentication Portal Service (APS) module.

In some embodiments, the system also comprises four system components to manage operations of the system. These components include a messaging framework (MF), a management console (MC), a billing system (BS), and a monitoring system (MS). The message framework (MF) provides a framework through which the various system components can communicate.

In some embodiments, the system is configurable to allow for deployment in two modes. In the first mode document retrieval and delivery is made to a set of inbox and outbox folders. In the second mode document retrieval and delivery is fully automated.

BRIEF DESCRIPTION OF THE DRAWINGS

FIG. 2B is a schematic illustration of the order handler message definition, according to embodiments.

FIG. 3B is a schematic illustration of the order handler message definition, according to embodiments.

DETAILED DESCRIPTION

Described herein are exemplary systems and methods for electronic document management and delivery. Various methods described herein may be embodied as logic instructions on a computer-readable storage medium. When executed on a processor, various of the logic instructions cause a general purpose computing device to be programmed as a special-purpose machine that implements the described methods. The processor, when configured by the logic instructions to execute the methods recited herein, constitutes structure for performing the described methods.

Figure 1:
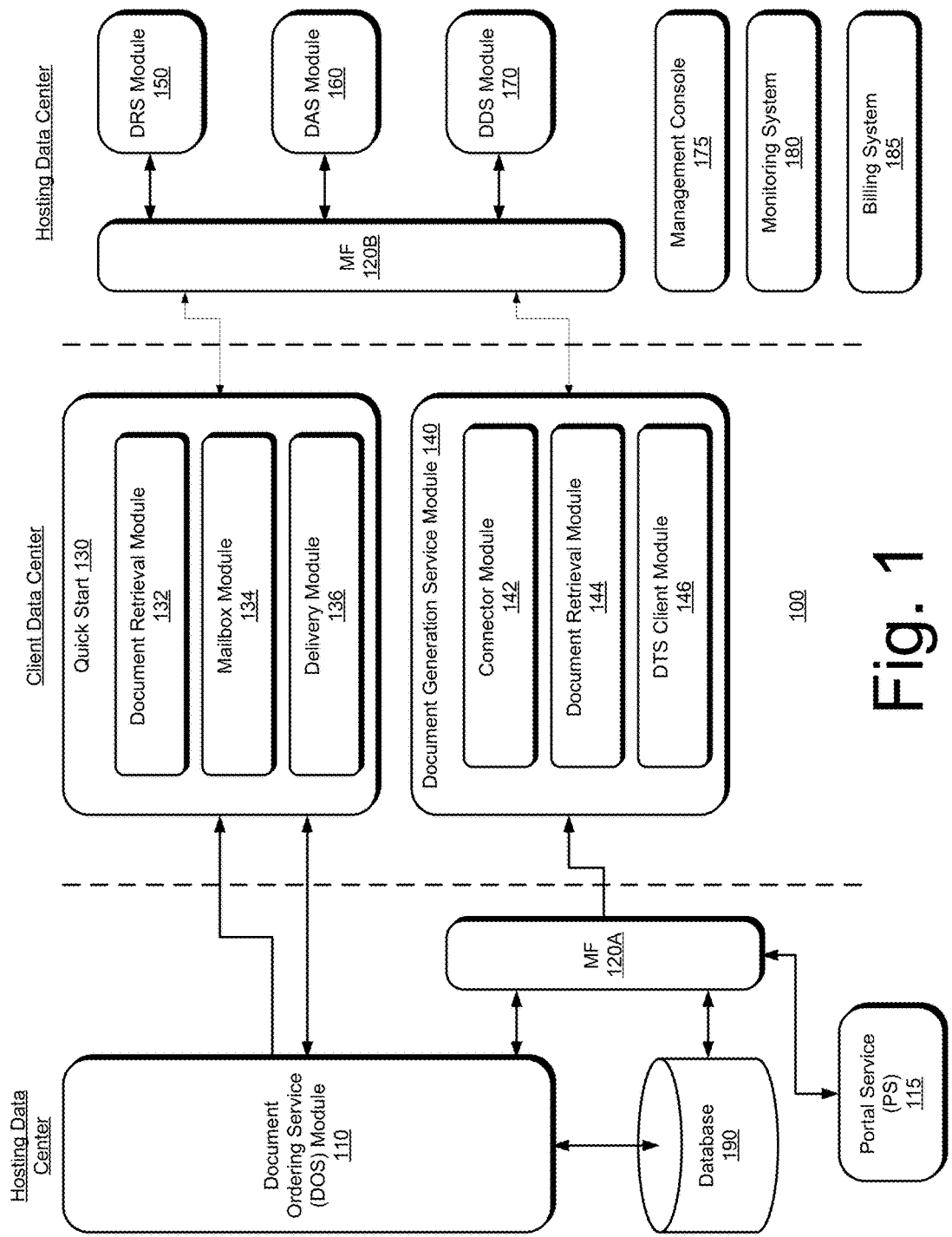
FIG. 1 is a schematic illustration of a system for electronic document management and delivery, according to embodiments.

FIG. 1 is a schematic illustration of a system for secure electronic document management and delivery, according to embodiments. Various components of a system 100 will be described with reference to FIG. 1. FIG. 1 is intended, in part, to illustrate data flows between components in a hosting center and a client data center. In practice, the hosting data center may represent one or more data centers which provide a document management and delivery service, and the client data center may represent one or more data centers which utilize services provided by the system 100 to manage secure documents and/or to deliver secure documents to a destination.

System 100 may be used by external parties to facilitate the management and delivery of secure documents. For example, in some embodiments, the client data center may represent a university, a healthcare provider, a financial services provider, or the like. In some embodiments, third parties such as, for example, alumni of a university or customers of a healthcare provider or a financial services provider may use the system 100 to manage and/or to pull secure documents from the client data center. In other embodiments, the client data center may use the system 100 to push secure documents from the client data center to a third party.

Referring to FIG. 1, system 100 is illustrated with components in a hosting data center and a client data center. In the embodiment depicted in FIG. 1, the hosting data center comprises a document ordering service (DOS) module 110, a portal service (PS) module 115, a document rights service (DRS) module 150, a document authentication service (DAS) module 160, and a document delivery service (DDS) module 170. The client data center is illustrated with a quick start module 130 and a document generation service module 140. In practice, a client data center may comprise one of quick start module 130 or document generation service (DGS) module 140. A messaging framework (MF) 120 provides a communication framework between various components of the system 100 and permits the system 100 to assume multiple different configurations.

In some embodiments, the hosting data center further comprises a management console (MC) 175, a monitoring system (MS) 180, a billing system (BS) 185, and a database 190. Each of these modules will be described in greater detail below.

Document Order Service (DOS) Module

In some embodiments, the Document Ordering Service (DOS) module 110 implements an online ordering website that allows users of the system to order and pay for documents and document management services using conventional payment processing techniques such as, for example, credit card processing techniques, bank transfers, or the like. The DOS module 110 enables users of the system 100 to place orders for traditional paper documents, secure electronic documents or other products that may be offered through the client data center.

When a user of system 100 places an order via the DOS module 110, DOS module 110 generates a data record that represents the order that was placed by the user of the system. In one embodiment, the order record includes a header and an order document. The form of the header is depicted in Table 1 and the form of the order record is depicted in Table 2.

The database 190 includes defined lists of order-records of data. Each order-record describes aspects of a specific document request and contains the document request information that was generated and/or manipulated by the user of the DOS 110. Thus, each order-record is standardized, regardless of who entered the information into the order-record.

TABLE 1

Order Header

| Data Element | Type | Description |
|---|---|---|
| order_id | Integer | unique order identifier |
| school_id | Integer | unique organization identifier |
| orders_external_status | String | DGS Processing Status |
| order_capture_total | Float | Amount actually charged to the user |
| x_customers_authorization | Boolean | Authorization status of User |
| x_orders_consent | Boolean | Consent Status of User |
| Source | String | Order Source (DOS, APS, DTS, Other) |
| admin_id | Integer | APS User Id |
| ap_multiple_document_flag | Boolean | 1 - Order is an APS multiple document order  0 - Order is not an APS multiple document order |

Referring to Table 1, the header includes a data field (order_id) which uniquely identifies the order number and a data field (school_id) which uniquely identifies the organization associated with the client data center. The header also includes a data field (orders_external_status) which identifies the processing status of the order with the document generation service (DGS) module. In some embodiments, this data field is set to a value which indicates whether the document generation service (DGS) module has successfully retrieved the order.

TABLE 2

Order Document

| Data Element | Type | Description |
|---|---|---|
| order_product_id | Integer | unique order product identifier |
| delivery_status_message | String | MF Processing message |
| signing_reason | String | Reason text embedded in signature by the DAS |
| signing_location | String | Location text embedded in signature by the DAS |
| signing_contactinfo | String | Contact Information embedded in signature by DAS |
| external_status | String | DGS Processing Status |
| delivery_email | String | DDS Delivery email address |
| delivery | String | DDS Delivery method |
| source | String | Order Source (DOS, PS, DTS, Other) |
| adds1_envelope_flag | Boolean | 1 - Order Item is a multiple document envelope  0 - Order Item is not a multiple document envelope |
| delivery_status | String | Order Item Status |
| orders_products_filename | String | DDS Delivery filename |
| download_maxdays | Integer | DDS Download expiration counter |
| download_count | Integer | DDS Download counter |

TABLE 2-continued

| Data Element | Type | Description |
| --- | --- | --- |
| d_id | String | DDS Secure Download document identifier |
| doc_password | Blob | DDS Secure Download passcode |
| login_attempts | Integer | DDS Secure Download login attempt counter |
| last_attempt | Date | DDS Secure Download login attempt tracking |
| date_available | Datetime | DDS Download availability |

Referring to Table 2, the Order Document includes a data field (order_product_id) which uniquely identifies the product ordered and other data fields which represent various attributes order.

Thus, the output of the DOS 110 is a computer message that, among other things, contains an order identifier which uniquely identifies the order-record in the Database 190. The use of the database 190 to supplement the computer message between the DOS module 110 and the MF 120 reduces the amount of data transmitted between the DOS module 110 and the MF, which allows for the efficient transmission of a complete order-record. For example, when an order is completed in the DOS 110, the order identifier is transmitted to the MF 120 for processing. By passing the order identifier in the data message, the MF 120 is able to access the order-record in the database 190 and make processing decisions based on the order-record values without the incurring the overhead of passing the entire order-record in the computer message. In addition, including the order identifier in the computer message instead of the entire order-record allows enhancements to be made to the DOS 110 and to the MF 120 independently.

Figure 2A:
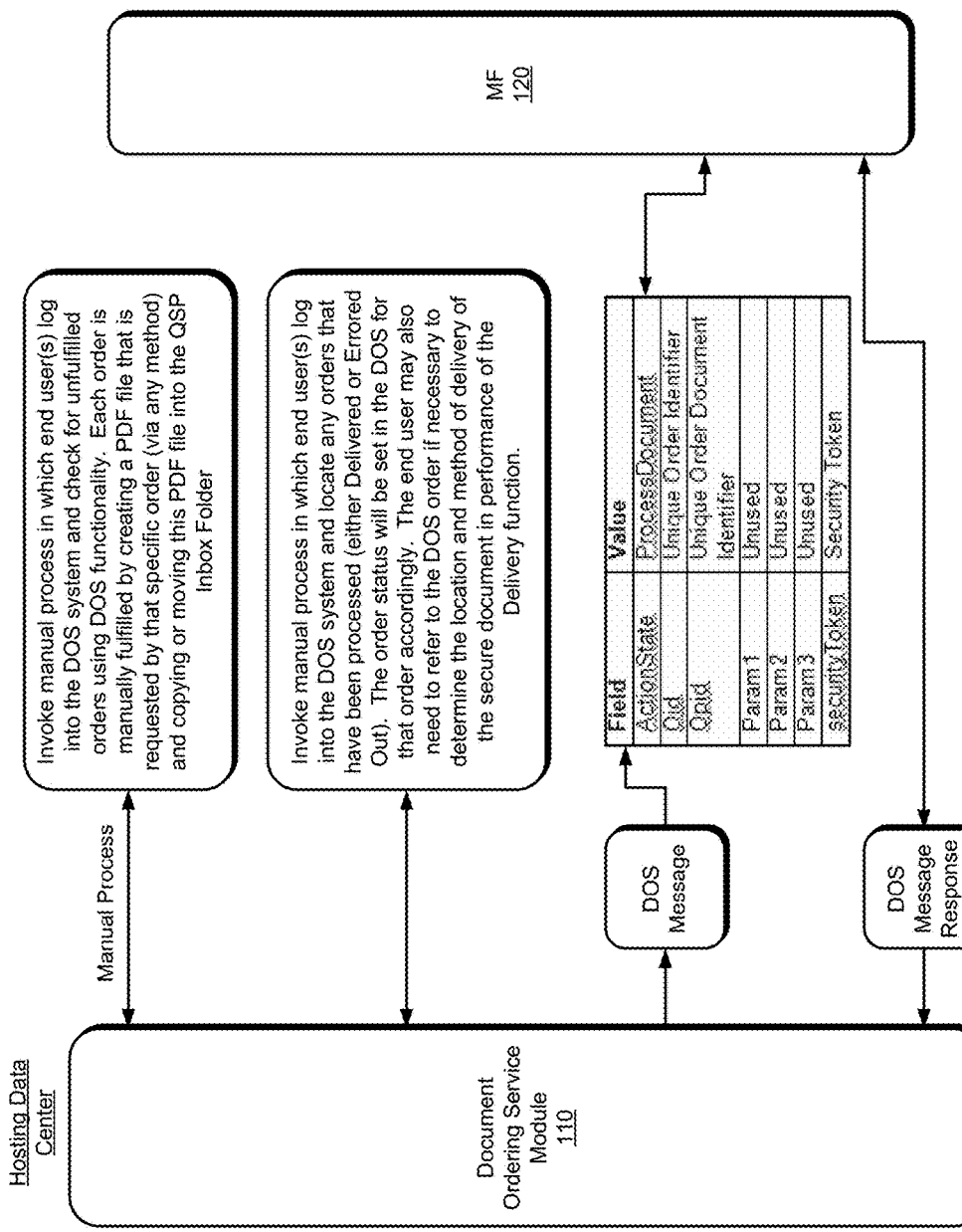
FIG. 2A is a schematic illustration of aspects of the document order service module messaging function, according to embodiments.

FIG. 2A is a schematic illustration of aspects of the document order service module messaging function, according to embodiments, and FIG. 2B is a schematic illustration of the order handler message definition, according to embodiments. When an order is received in the DOS module 110, the DOS module 110 generates a DOS message which is output to the MF 120. As depicted in FIG. 2, in one embodiment the DOS message comprises a field (Oid) that uniquely identifies the order and an field (Opoid) that uniquely identifies the order document. The DOS message also includes a field (ActionState) that determines how the MF 120 processes the document and may include a securityToken field that holds a shared secret for authenticating the message. The DOS message is input to the MF 120, which processes the message and generates a DOS message response, which is returned to the DOS module 110. Details of the processing performed by the MF 120 are described below.

Document Generation Service (DGS) Module

The Document Generation Service (DGS) module 140 comprises components and services used to convert data content (i.e., typically computer files) into Portable Document Format (PDF) digital document files. In some embodiments the DGS module 140 invokes the services of one or more third-party systems, e.g., Adobe® Acrobat®, to generate a PDF file based on the document request from the DOS module 110.

In the embodiment depicted in FIG. 1, the DGS module 140 comprises a connector module 142, a document retrieval module 144, and a data transport service (DTS) client module 146. The DGS module 140 accepts a document request from the DOS module 110 by way of a computer message from the MF 120 via the connector module 142. As described above, the data message from the DOS module 110 contains the information required for the document retrieval module to retrieve the document content from one or more of a plurality of third party systems and to convert the content to a PDF file. The DGS module 140 then sends a computer message containing the PDF file to the MF 120 for additional processing via the DRS module 150, DAS module 160 or DDS module 170.

Figure 3A:
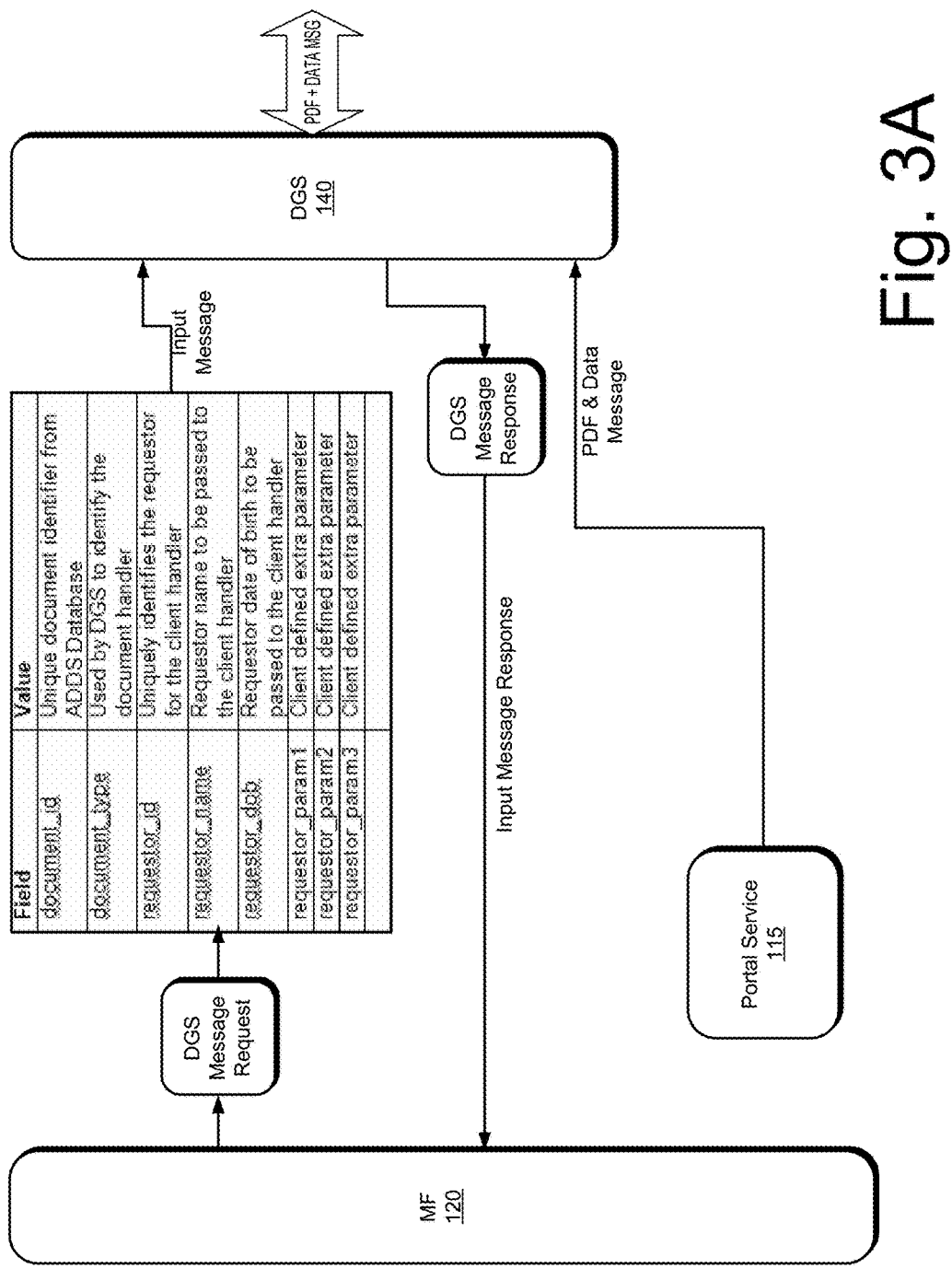
FIG. 3A is a schematic illustration illustrating aspects of the document generation service module messaging function, according to embodiments.

FIG. 3A is a schematic illustration of aspects of the document generation service (DGS) module messaging function, according to embodiments, and FIG. 3B is a schematic illustration of the order handler message definition, according to embodiments. Referring first to FIG. 3A, the MF 120 forwards a DGS message request to the DGS module 140. Among other elements, the DGS message includes a document_id field which contains a unique document identifier from the database 190, a document_type field which the DGS module 140 uses to identify the document handler, a requestor_id field that uniquely identifies the requestor, a requestor name field and an requestor_dob field that includes the date of birth of the requestor. Additional details of the DGS message request are depicted in FIG. 3B.

The DGS module 140 receives the DGS message request and, using one or more data fields in the request, the document retrieval module 144 retrieves an electronic document from the client data center. For example, the document may represent a student's transcripts or a patient's medical records. If necessary, the document is converted to a PDF format.

The DGS module 140 then generates a MF message that is transmitted to the MF 120. In one embodiment the MF message conforms to the PESC DTS 1.0 Specification (DTS). The DTS Message contains information required by the MF 120 to identify the MF Message Type of the message, information used by the MF 120 to process the document, and the PDF file of the document to be processed. Attributes of the DGS message headers implemented pursuant to the DTS specification are defined in Table 3 through Table 10.

TABLE 3

Routing Header

| Field | Defined In DTS Spec | | Implementation Specific |
|---|---|---|---|
| | Description | Type | Contents |
| UUID | Is a unique identifier of the request[1] | String | UUID - Response will use UUID from Request |
| SourceId | Identifies the source of the request (response) | String | FICE#, or unique id |
| SourceId SubCode | Identifies a secondary code that helps identify the source of the request (response). | String | Blank - Reserved for future use |
| RecipientId | Identifies the recipient of the request (response). | String | FICE#, or unique id |
| RecipientId SubCode | Identifies a secondary code that helps identify the recipient of the request (response). | String | Blank - Reserved for future use |
| Transmission DateTime | The date/time stamp of the request (response) | Datetime | |

Referring to Table 3, the routing header includes data fields that facilitate routing the message from the DGS module 140 to the MF 120.

TABLE 4

Payload Type Header

| Field | Defined In DTS Spec | | Implementation Specific |
|---|---|---|---|
| | Description | Type | Contents |
| Value | This element identifies the type of payload within the request. | String | Request: TranscriptDelivery - Normal Transcript Processing Status - Document Status Update Response: Same as Request |

Referring to Table 4, the payload type header includes a data field that identifies the payload type.

TABLE 5

DTS Service Expectation Header

| Field | Defined In DTS Spec | | Implementation Specific |
|---|---|---|---|
| | Description | Type | Contents |
| Value | This element is to be used to identify how the transaction should be processed. | String | Value: Immediate |

Referring to Table 5, the DTS service expectation header includes a data field that identifies how the transaction should be processed.

TABLE 6

DTS Request Signature Header

| Field | Defined In DTS Spec | | Implementation Specific |
|---|---|---|---|
| | Description | Type | Contents |
| Value | This element is to be used to hold the digital signature of the compressed and encoded request payload. The data in this element must be base64 encoded. | String | Digital signature per spec |

Referring to Table 6, the DTS signature header includes a data field that holds the digital signature of the compressed and encoded request payload.

TABLE 7

DTS Request Payload Bytes Header

| Field | Defined In DTS Spec | | Implementation Specific |
|---|---|---|---|
| | Description | Type | Contents |
| Value | This element holds the decompressed byte count of the request payload (response). | Integer | Decompressed byte count of payload (response) |

Referring to Table 7, the DTS request payload bytes header includes a data field that holds the decompressed byte count of the request payload (i.e., the response).

TABLE 8

DTS Response Acknowledge Header

| Field | Defined In DTS Spec | | Implementation Specific |
|---|---|---|---|
| | Description | Type | Contents |
| Value | This element is used to identify how the Service handled or will handle the transaction. | String | Value: Immediate |

Referring to Table 8, the DTS response acknowledge header includes a data field that is used to identify how the Service handled or will handle the transaction.

TABLE 9

Request Message Element

| Field | Defined In DTS Spec | | Implementation Specific |
|---|---|---|---|
| | Description | Type | Contents |
| Value | Payload | String | Base 64 encoded, compressed PDF file |

Referring to Table 9, the request message element includes a payload data field containing the PDF document.

TABLE 10

Response Message Element

| | Defined In DTS Spec | | Implementation Specific | |
|---|---|---|---|---|
| Field | Description | Type | Contents | |
| Value | Base 64 encoded, compressed string | String | Message response | |

Referring to Table 10, the request message element includes a message response data field.

If the DTS message is being sent to fulfill a document request, either from the PS or the DOS, an additional DTS header is required. This header contains the information required to support the processing by the MF 120. Aspects of the additional DTS header are illustrated in Table 10.

TABLE 10

Document Processing Header

| | Defined In DTS Spec | | Implementation Specific |
|---|---|---|---|
| Field | Description | Type | Contents |
| ADDSProcessMode | Indicates a TEST or PRODUCTION document. | String | Default to TEST |
| ADDSOrderSourceCode | Indicates the source of the document DOS - Originates in the DOS PORTAL - Internal Use Only OTHER - 3$^{rd}$ Party Ordering System | String | Set this to DOS |
| ADDSOrderItemID | The order item id. | String | The order item id if the document originates in DOS, PS |
| ADDSRecipientEmail | Document Recipient email address | String | The email address of the recipient. Not required for Status Update Messages |
| ADDSSigningReason | Reason to embed in the document's certification | String | Optional |
| ADDSSigningLocation | Location to embed in the document's certification | String | Optional |
| ADDSSigningContactInfo | Contact Information to embed in the document's certification | String | Optional |

Referring to Table 10, the document processing header includes an ADDSProcessMode data field that indicates whether the document requested is a test document or a production document, an ADDSOrderSourceCode data field that indicates the source of the document, an ADDSOrderItemID data field that indicates the order item ID, an ADDSRecipientEmail data field that includes the email address of the document recipient.

There are two message types (DTS PayloadTypes) that the MF 140 will process, the TranscriptDelivery message and the Status message. The TranscriptDelivery message will process the included document according to the MF Message Type configuration. This may include DRM, DAS and DDS.

TABLE 11

Transcript Delivery Message

| Field | Header | Value |
|---|---|---|
| DTSRequestPayloadType | DTS | TranscriptDelivery |
| ADDSRecipientEmail | Avow | Required - Contains the Recipients Email Address |

TABLE 11-continued

Transcript Delivery Message

| Field | Header | Value |
|---|---|---|
| Pay load | DTS Message | Contains the PDF Document |

Referring to Table 11, the TranscriptDelivery message includes a DTSRequestPayloadType data field, an ADDSRecipientEmail data field that includes the email address of the document recipient, and a Payload field that includes the PDF document.

The Status message will update the status values of the Order Record in the database 190 that is uniquely identified by the contents of the message.

TABLE 12

Transcript Delivery Message

| Field | Header | Value |
|---|---|---|
| DTSRequestPayloadType | DTS | Status |
| ADDSRecipientEmail | Avow | Not Required |
| Pay load | DTS Message | Contains the status message in XML format (see below) |

Referring to Table 12, the Status message includes a DTSRequestPayloadType data field, an ADDSRecipientEmail data field that includes the email address of the document recipient, and a Payload field that includes status message in XML format (see below).

The DTS Message response value is a message specific value returned in the response message element. For all MF messages, this response will be a status value of the results of the message. The one exception to this is for the messages with the DDS 170 DTS Reply delivery method.

TABLE 13

DTS Message Response

| Payload Type | MF Message Type (DDS 170 Delivery Method) | Response |
|---|---|---|
| TranscriptDelivery | DTS Reply | PDF File containing the document - Message was successful "Error" - The message was not successful |
| TranscriptDelivery | not DTS Reply | "Success" - The message was successful "Error" - The message was not successful |
| Status | n/a | "Success" - The message was successful "Error" - The message was not successful |

Referring to Table 13, the Status message includes a DTSRequestPayloadType data field, an ADDSRecipientEmail data field that includes the email address of the document recipient, and a Payload field that includes status message in XML format (see below).

When the message is received by the MF 120, the MF 120 processes the message as described below.

Document Rights Service (DRS) Module

The Document Rights Service (DRS) module 150 provides control over how documents are used once they have been distributed. In one embodiment, the modular framework utilizes the Adobe® LiveCycle™ Policy Server to create a service that can integrate into existing document workflow processes. The Adobe® LiveCycle™ Policy Server allows for the application of persistent and dynamic security policies to documents that enable users to specify who has access, what they can do, when, and for how long. Authors can also update security policies at any time, even after distribution, so organizations can manage and track access no matter where a document resides.

The Document Rights Service module 150 along with the Adobe® LiveCycle™ Policy Server, enables the system 100 to reduce the costs and risks of distributing confidential information, control document access and usage rights online or offline, inside or outside the firewall, know when a document has been viewed, printed, or altered, extend version control beyond document and content management systems, leverage Adobe Acrobat® and free Adobe Reader® software to author and view protected documents, and revoke access to previously distributed documents.

Figure 4:
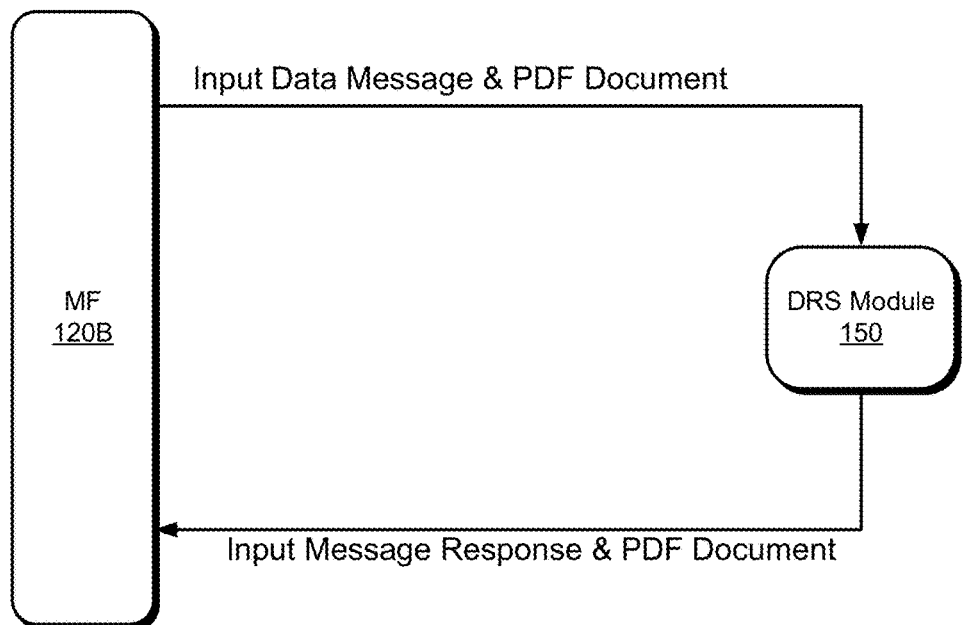
FIG. 4 is a schematic illustration of aspects of the document rights service module messaging function, according to embodiments.

FIG. 4 is a schematic illustration of aspects of the document rights service module messaging function, according to embodiments. Referring to FIG. 4, the DRS module 150 accepts a computer message containing the document (PDF file) to be protected with document rights. The computer message that includes a PDF file containing the document to be processed and the MF Message Type Object. The MF Message Type Object is a computer programming language object that contains the values from a single MF Message Type Data Record in the Database 190. A computer programming language object is a software bundle of related state and behavior. The MF Message Type Object contains the information required by the DRM to establish a connection to the Adobe® LiveCycle™ Policy Server, the authentication information required by the DRM to log in to the Policy Server and the unique identifier used to locate the policy to be applied to the document. One example of a MF Message Type Data Object is describe above. An example of a MF Message Type Data Record is presented in Table 14.

TABLE 14

MF Message Type Data Record

| Data Element | Type | Description |
|---|---|---|
| admin_key_id | Integer | unique MF message type identifier |
| school_id | Integer | unique organization identifier |
| default_products_id | Integer | default document for this message type |
| dts_source_id dts_source_id_subcode dts_source_payload_type | String | Used to uniquely identify the MF message type |
| dts_source_public_key | String | Used to validate the AMF DTS message |
| aps_policy | String | DRM processing identifier |
| hsm_key | String | DAS certificate identifier |
| cert_reason | String | DAS default reason text embedded in certificate |
| cert_location | String | DAS default location text embedded in certificate |
| cert_contactinfo | String | DAS default contact information text embedded in certificate |
| cert_visible | Boolean | 0 - DAS places invisible certificate field on document 1 - DAS places visible certificate field on document |
| cert_page_num | Integer | DAS page number for placing visible signature on document |
| cert_position_x cert_position_y cert_position_w cert_position_h | Integer | DAS coordinates for placing visible signature on document |
| cert_graphic | String | DAS filename of graphic to be placed on document with signature |
| cert_graphic_position_x cert_graphic_position_y | Integer | DAS coordinates for placing graphic on document |
| cert_graphic_page_num | Integer | DAS page number for placing graphic on document |
| cert_watermark | Boolean | 0 - DAS inserts graphic as a non-watermark on document 1 - DAS inserts graphic as a watermark on document |
| default_delivery_mode | String | DDS default delivery mode for this message type |
| dest_recipient_id dest_recipient_id_subcode | String | DDS used to uniquely identify the destination DTS Server for the DTS delivery method |
| dest_recipient_public_key | String | DDS used to validate the DTS delivery message |
| dest_recipient_url | String | DDS DTS Delivery web service address |

The DRS module 150 determines which document rights should be applied to the document identified in the message. The DRS module 150 then returns the policy protected document to the MF 120 for processing. The response to the input message is a PDF file containing the policy protected version of the PDF file in the input message.

Once the response is received in the MF 120, the MF 120 processes the response message as described below.

Document Authentication Service (DAS) Module

Figure 5:
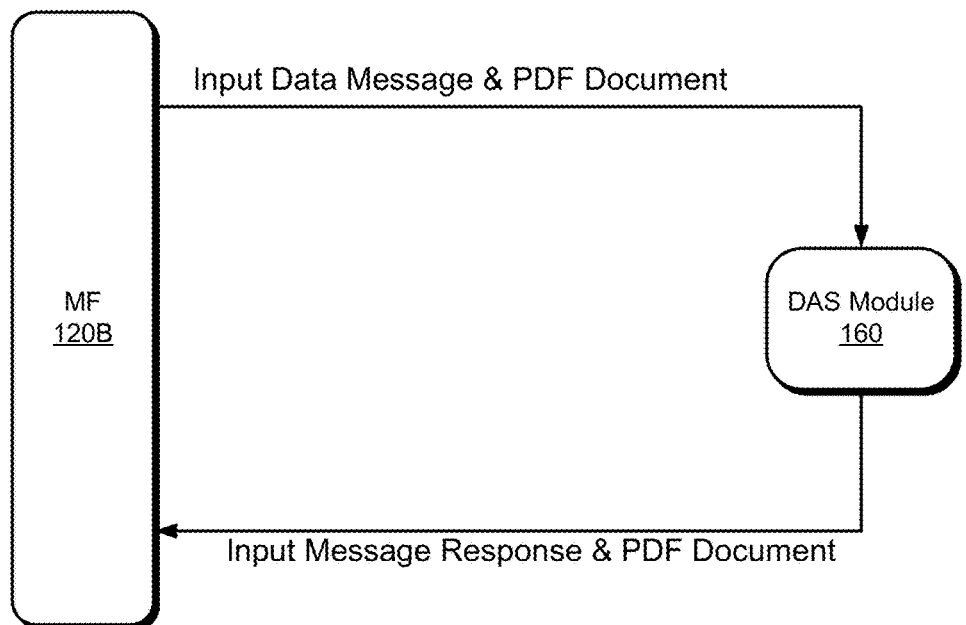
FIG. 5 is a schematic illustration of aspects of the document authentication service module messaging function, according to embodiments.

The Document Authentication Service (DAS) module provides additional security by applying a certifying digital signature to the digital document. FIG. 5 is a schematic illustration of aspects of the document rights service module messaging function, according to embodiments. Referring to FIG. 5, the DAS module 160 accepts a computer message containing the document (PDF file) to be protected with document rights. In one embodiment, the message includes the document to be processed and the MF Message Type Object. As described above, the MF Message Type Object is a computer programming language object that contains the values from a single MF Message Type Data Record in the database 190. The MF Message Type Object contains the information required by the DAS to identify the unique certifying digital signature to be applied to the document, the reason, location and contact information text to be embedded into the signature, where the signature should be displayed on the document and whether any additional graphics should be added to the document during the application of the signature.

The DAS service accepts the digital document (Portable Document Format—PDF file), applies certification through a digital signature using, in one embodiment, the True Credentials for Adobe® certificate, and reinserts the document back into the document workflow via the MF 120.

In one embodiment, the Document Authentication Service (DAS) module 160 invoices services from third-party providers. For example, Adobe® LiveCycle™ Document Security software provides digital signature and encryption capabilities in a server environment that enable placing a digital signature onto a Portable Document Format (PDF) file, and VeriSign True Credentials® for Adobe® allows creation of secure Portable Document Format (PDF) documents that clearly and automatically certify to recipients that the author's identity has been verified by a trusted organization and that the document has not been altered.

The DAS module 160 also implements a Hardware Security Module (HSM) such as a SafeNet Luna SA which is an Ethernet-attached server offering cryptographic acceleration, hardware key management, and multiple configuration profiles for applications where security and performance are a priority. It is a requirement by Adobe® that the encryption keys are stored and protected by a FIPS 140-1 Level 3 device such as the Luna SA HSM.

The DAS module 160 then returns the certified document to the MF for additional processing. Once the message is returned to the MF 120, the MF 120 processes the message as described below.

Document Delivery Service (DDS) Module

Figure 6:
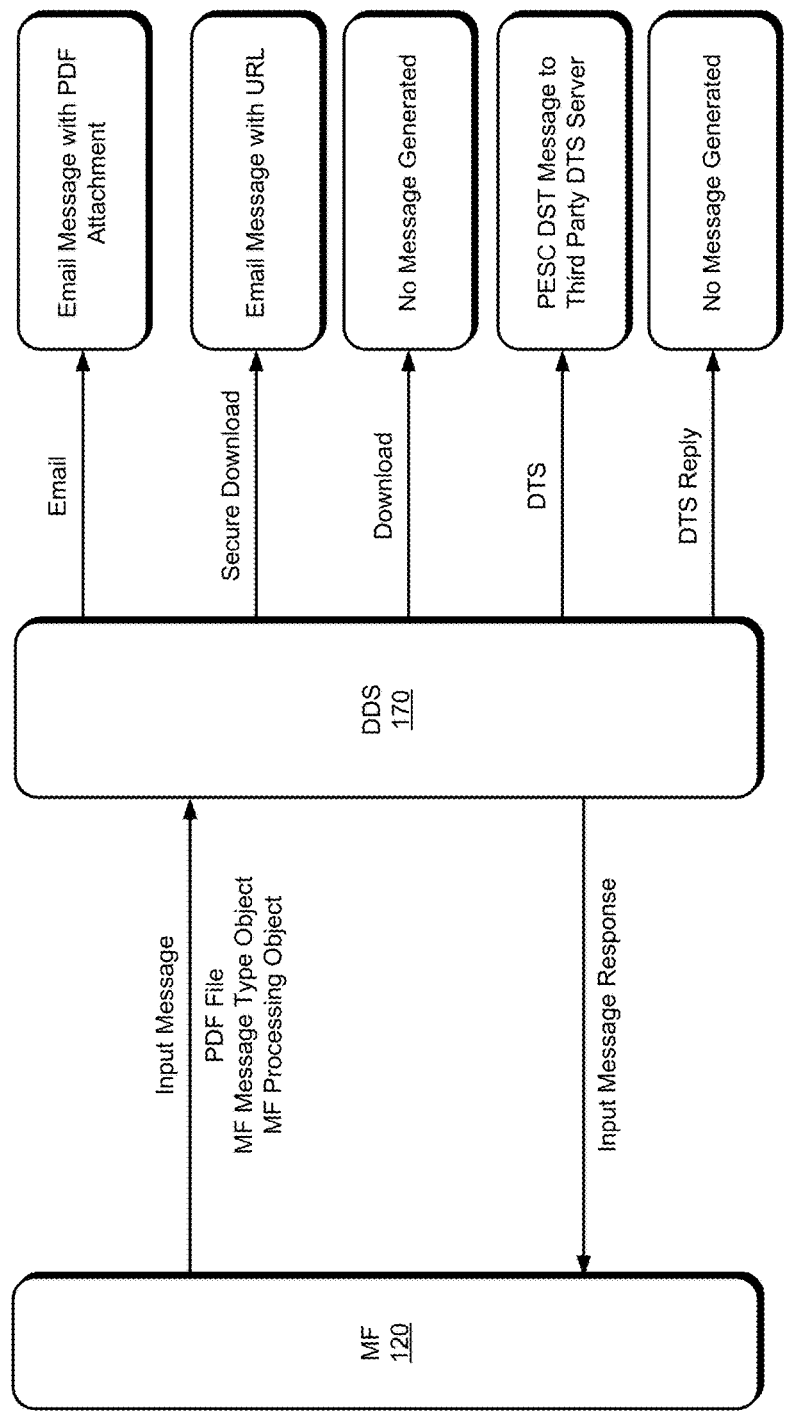
FIG. 6 is a schematic illustration of aspects of the document delivery service module process flow, according to embodiments.

FIG. 6 is a schematic illustration of aspects of the document delivery service module process flow, according to embodiments. Referring to FIG. 6, the Document Delivery Service (DDS) module 170 receives an input message from the MF 120, processes the input message, and delivers a document to the recipient using at least one of five possible delivery methods. The delivery method to be used is determined by the MF Message Type information included in the input computer message. The available delivery methods for the DDS include: (1) a DDS Email Delivery Method, (2) a DDS Secure Download Delivery Method, (3) a DDS Requestor Download Delivery Method, (4) a DDS DTS Delivery Method, and (5) a DDS DTS Response Delivery Method.

In some embodiments the input message to the DDS module 170 is a computer message that includes: (I) a PDF file containing the document to be delivered, (2) the MF Message Type Object, and (3) the MF Processing Object.

The Email Delivery Method delivers the document to the recipient using an Internet email message with the document attached. The term "email" includes the Internet e-mail system based on the Simple Mail Transfer Protocol (SMTP) and to X.400 protocols.

The Secure Download Delivery Method sends an email message to the recipient which includes the Uniform Resource Locator (URL) containing the complete location of the DDS Secure Download web site. Also included in the URL is a document identifier that will uniquely identify the document to be downloaded. The recipient of the email message may use the URL in an internet browser to access the download site and download the document.

The challenge in delivering certified documents is to limit access to only the intended recipients. The DDS module 170 solves this challenge through the use of a secure SSL web site and a strategy of multiple emails. After the document has been certified and policy protected, it will be published to a secure web site. An email will be automatically generated and sent to the recipient. The email will contain a link or URL to the document and instructions on how to download it. The URL will be formatted in such a way as to prevent a user from reverse engineering the link and then using that information to "guess" another URL. As a further precaution, a second email will be sent containing a password required to access the URL.

The Requestor Download Delivery Method allows the document to be downloaded by the requestor in the MC. The DDS will store the document in the file system, then update the download information for the document's order-record in the database 190.

The DTS Delivery Method constructs a XML messages conforming to the PESC DTS Specification and send the message to the third party DTS Server identified by the MF Message Type Object.

The Requestor Download Delivery Method will return the PDF file containing the document to the MF in the response to the DDS input message. The MF, in turn, will return the PDF file to the originator of the MF input message where it then delivered.

As described above, the MF Message Type Object is a computer programming language object that contains the values from a single MF Message Type Data Record in the database 190. The MF Message Type Object contains the information required by the DDS identify the method by which the document is to be delivered. If the document is to be delivered to a DTS Web Service using the DTS delivery method, the object contains the information about the destination DTS Server.

The MF Processing Object is a computer programming language object used by the MF to store in-process information pertaining to the document in the current message. During normal operation, the MF 120 collects processing information about a document from the database 190 which is then stored in computer memory in an MF Processing Object. The use of an object to store this information allows for the efficient use of the information by the DDS and other services without incurring the overhead of retrieving the information from the database 190. The MF Processing Object contains information required by the DDS to identify the method by which the document is to be delivered. It also contains the order identifier which will uniquely identify the order record in the database 190.

Figure 7:
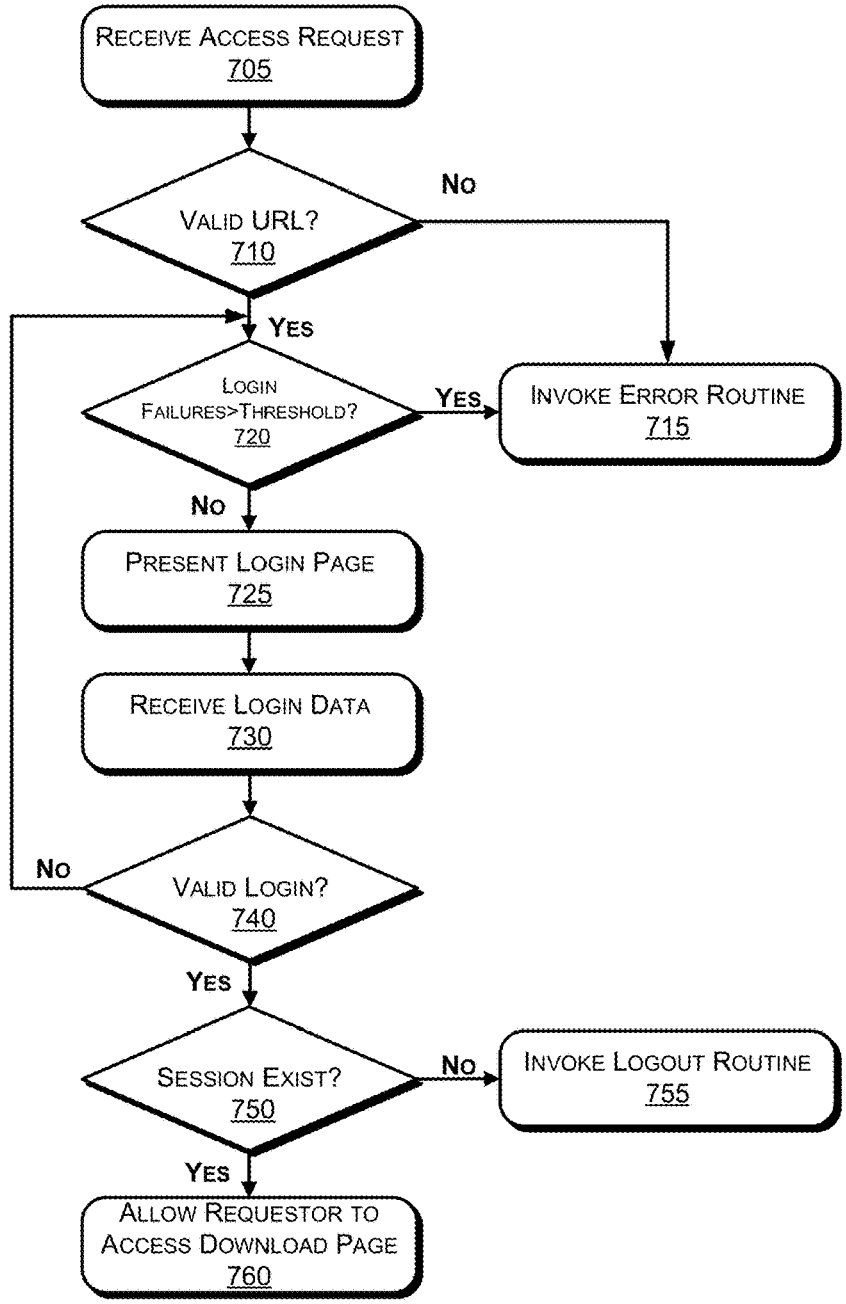
FIG. 7 is a flowchart illustrating operations in a method to authenticate an access request, according to embodiments.

In some embodiments the DDS module 170 implements an authentication process to authenticate requests for documents. FIG. 7 is a flowchart illustrating operations in a method to authenticate an access request, according to embodiments. Referring to FIG. 7, at operation 705 an access request is received in the DDS module 170. In some embodiments, the access request may originate from a remote computing device operated by a user of the system 100.

In some embodiments, the authentication process determines whether the uniform resource locator (URL) associated with the access request represents a valid URL. For example, in some embodiments the system 100 maintains a list of valid URLs in the database 190. If, at operation 710, the URL associated with the access request is not valid, then control passes to operation 715 and an error routine is invoked. The error routine may include presenting an error page to the entity that originated the request. By contrast, if at operation 710 URL is valid then control passes to operation 720.

If, at operation 720 the number of login failures seats a threshold that control passes to operation 715 and an error routine is invoked. The error routine may include presenting an error page to the entity that originated the request. By contrast, if at operation 720 the number of login failures does not exceed the threshold and control passes to operation 725 and a login page is presented to the requester. At operation 730 login data is received from the requester.

If, at operation 740 the login data presented by the requester is not a valid then control passes back to operation 720. By contrast, if at operation 740 the login data presented by the requester is valid then control passes to operation 750.

If, at operation 750 a session does not exist then control passes to operation 755 and a logout routine is invoked. In some embodiments, a logout routine includes presenting a logoff/timeout page to the requester. By contrast, if at operation 750 a session exists then control passes to operation 760 and requester is allowed access to the download page.

From the download page, the requester can make a request for one or more documents managed by the system 100.

Figure 8:
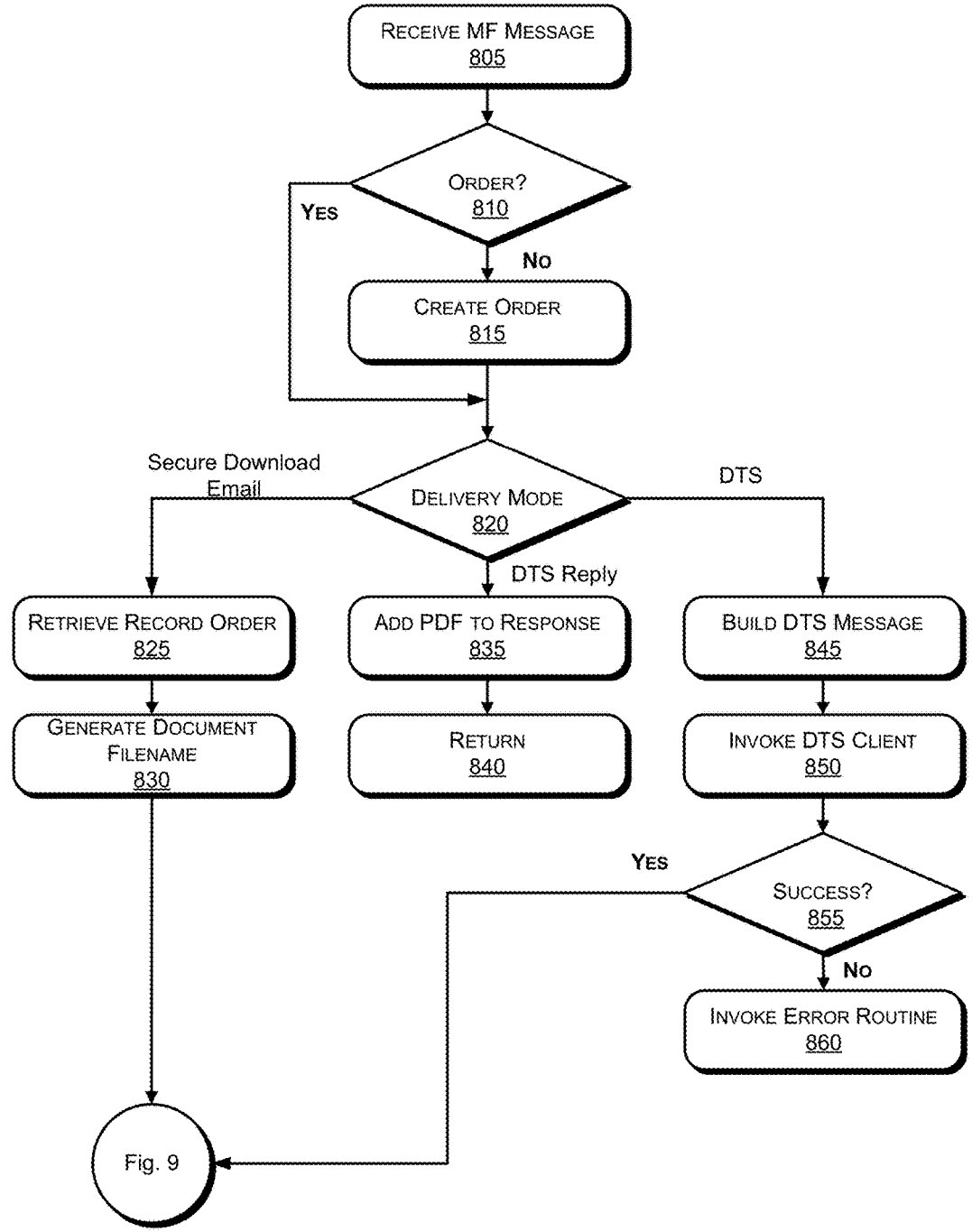
FIGS. 8-9 are flowcharts illustrating operations in a method of document delivery service processing, according to embodiments.
Figure 9:
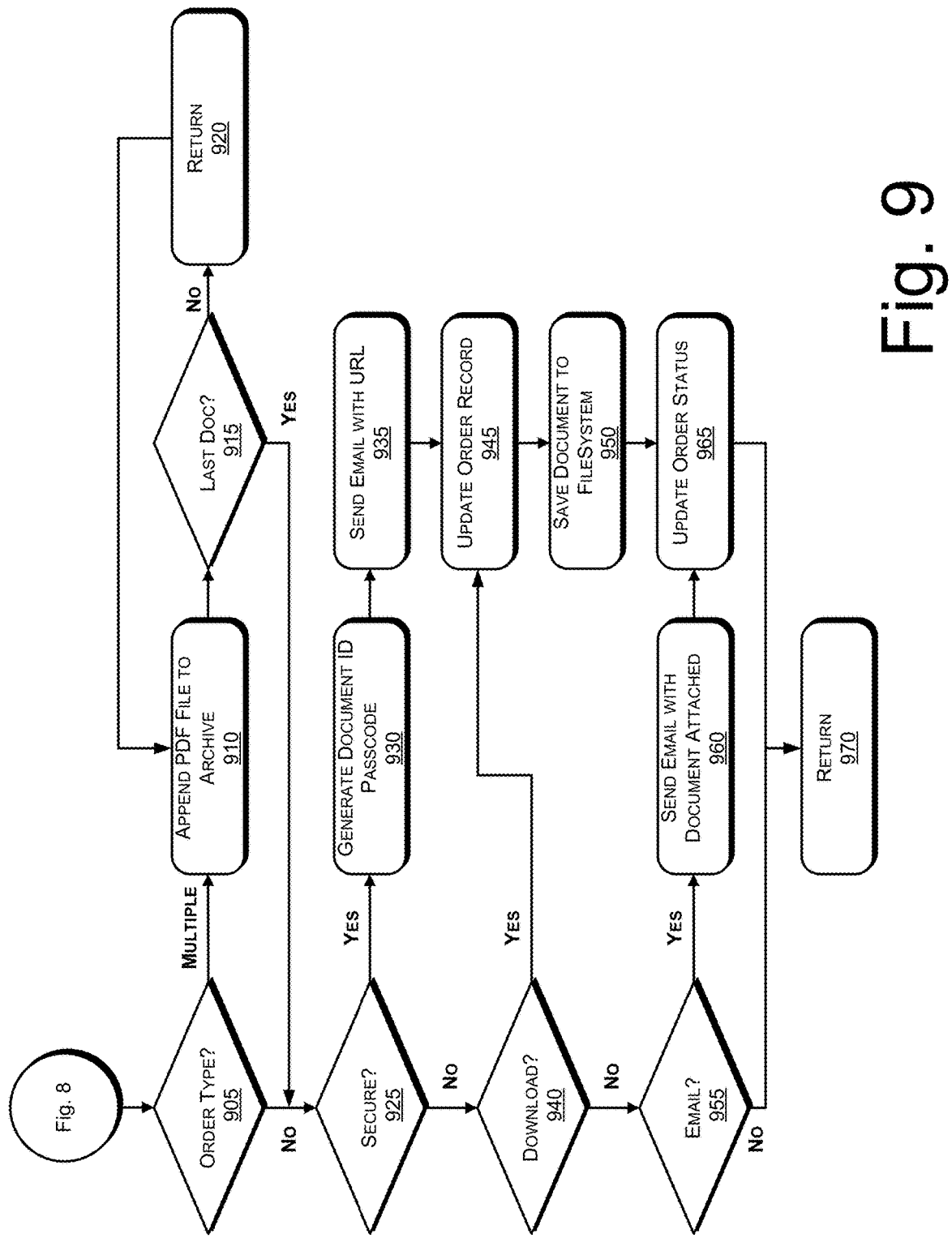

In some embodiments, the DDS implements logic to determine which delivery option will be used to deliver the document to the recipient. FIGS. 8-9 are flowcharts illustrating operations in a method of document delivery service processing, according to embodiments.

Referring to FIG. 8, at operation 805 a request message is received from the MF 120. If, at operation 810, the request message does not reference an existing order that control passes to operation 815 and an order is created. By contrast, if at operation 810 the request message references an existing order than the existing order can be retrieved.

At operation 820 a delivery logic routine is selected based upon the delivery mode indicated in the request. If the request indicates that the document should be delivered by a secure download or by e-mail then control passes to operation 825 and the record order is retrieved, and at operation 830 file name is generated for the requested document. Control then passes to the operations depicted in FIG. 9, which are discussed below. By contrast, if the request indicates that the document should be delivered by a DTS reply then control passes to operation 835 and a PDF document is added to the response message. At operation 840 the DTS reply is returned to the MF 120. Finally, the request indicates that the document should be delivered by the DTS delivery method then control passes to operation 845 and a DTS message is constructed. At operation 850 the DTS client module transmits the document to the recipient's DTS Server in the form of a DTS message.

If, at operation 855, the document transfer fails then control passes to operation 860 and an error routine is invoked. By contrast, if at operation 855 the document transfers successful control then passes to the operations depicted in FIG. 9.

Referring now to FIG. 9, if at operation 905 the document is part of a multiple document order, then the PDF file containing the document is appended to the archive. Control then passes to operation 915. If at operation 915 the document is not the last document in the order then control passes to operation 920 and control returns to the MF 120. By contrast, if at operation 915 retrieved document represents the last document in the request then control passes to operation 925.

If at operation 925 the secure download delivery method is requested and control passes to operation 930 and a document identifier pass code is generated. Control then passes to operation 935 an e-mail comprising a uniform resource locator (URL) which may be used to access the document is sent to the requester. Control then passes to operation 945 and the order record is updated in database 190. At operation 950, the document is saved to the filesystem. And at operation 965 the order status is updated in database 190 to reflect the document has been delivered. By contrast, if at operation 925 a secure download method is not requested then control passes to operation 940.

If at operation 940 the download delivery method is requested, control then passes to operation 945 and the order record is updated in database 190. At operation 950, the document is saved to the filesystem. And at operation 965 the order status is updated in database 190 to reflect the document has been delivered. By contrast, if at operation 940 a download method is not requested then control passes to operation 955.

If at operation 955 the email delivery method is requested, control then passes to operation 960 and an email is sent to the requestor with the attached documents. Control then passes to operation 965 the order status in database 190 is updated to reflect the document has been delivered.

When the document is delivered, the DDS 170 generates an output message to the messaging framework 120. The output of the DDS is dependant upon the delivery method of the document being processed. All delivery methods will send an output message to the MF containing the results status of the DDS operation. If the DDS module 170 delivers the document using the 'DTS Reply' method, the output message to the MF will contain the PDF file to be delivered.

The DDS Email Delivery Method will send an email message to the email address specified by the adds5_delivery_email value in the MF Processing Object. Attached to the email is the document that was included in the DDS input message.

The DDS Secure Download Delivery Method will send an email message to the email address specified by the adds5_delivery_email value in the MF Processing Object. Included in the email is the Uniform Resource Locator (URL) containing the complete location of the DDS Secure Download web site. Also included in the URL is a document identifier that will uniquely identify the document to be downloaded. The recipient of the email message will use the URL in an internet browser to access the download site and download the document.

The DDS Requestor Download Delivery Method has only one output message, the MF response message detailed above.

The DDS DTS Delivery Method will send a construct a XML messages conforming to the PESC DTS Specification and send the message to the third party DTS Server identified by the MF Message Type Object.

The DDS DTS Response Delivery Method has only one output message, the MF response message detailed above. This output message will contain the PDF File include in the input message to the DDS.

If a return message is received by the MF 120, the MF 120 processes the message as described below. Otherwise, notification emails are sent to the end users indicating that documents are ready for downloading from the DDS website portal.

Portal Service (PS) Module

The Portal Service (PS) module 115 is an online application that allows a user to manually submit a document to the MF 120, which will then process the document according to the document's configuration as described in Table 15. The PS module 115 presents of a series of web pages that prompt the user for document processing and delivery details. The PS module 115 collects the user's choices, stores the choices in the database 190 and sends a data message to the MF 120 containing a reference to the stored data.

| Data Element | Type | Description |
| --- | --- | --- |
| document-id | Integer | unique document identifier |
| school_id | Integer | unique organization identifier |
| adds1_ado_flag | Boolean | 0 - Document is not available in the DOS<br>1 - Document is available in the DOS |
| adds1_portal_flag | Boolean | 0 - Document is not available in the APS<br>1 - Document is available in the APS |
| adds1_ado_default_delivery | String | DDS Delivery mode for DOS documents |
| adds1_envelope_flag | Boolean | 0 - Document is not an APS document envelope<br>1 - Document is an APS document envelope |
| adds1_envelope_template | String | APS document envelope filename |
| adds2_processing_flag | Boolean | 0 - DGS processing is not enabled for document<br>1 - DGS processing enabled for document |
| adds3_flag | Boolean | 0 - DAS processing is not enabled for document<br>1 - DAS processing enabled for document |
| adds4_flag | Boolean | 0 - DRM processing is not enable for document<br>1 - DRM processing enabled for document |
| adds5_secure_flag | Boolean | 0 - DDS secure download is not available for this document<br>1 - DDS secure download is available for this document |
| adds5_download_flag | Boolean | 0 - DDS download is not available for this document<br>1 - DDS download is available for this document |
| adds5_email_flag | Boolean | 0 - DDS email delivery is not available for this document<br>1 - DDS email delivery is available for this document |
| adds5_dts_flag | Boolean | 0 - DDS DTS delivery is not available for this document<br>1 - DDS DTS delivery is available for this document |
| adds5_dts_reply_flag | Boolean | 0 - DDS DTS reply delivery is not available for this document<br>1 - DDS DTS reply delivery is available for this document |
| client_doc_type | String | DGS PDF generation control value |
| client_processing_type | String | AMF document processing control value |
| client_submission_url | String | AMF document processing web service address |
| client_submission_method | String | AMF document processing web service method |
| ap_hsm_key_id | Integer | DAS/DRM control values |

In one embodiment, the PS module 115 provides many functions, generates a data record that represents an order that was placed by the user of the system. This order is defined with the data elements listed in Tables 1 and 2. The following Order data is captured and stored by the PS module 115: Multiple Document Flag, Order Source, DDS Delivery Method, DDS Delivery Email Address, DDS Download Count, DDS Download Max Days, DAS Signature Reason, DAS Signature Location, DAS Signature Contact Info. When the output message is received by the MF, the MF processes the message as described below.

Messaging Framework (MF)

The Messaging Framework (MF) 120 comprises a collection of computer logic routines used to implement the various configurations of the system 100 and facilitate the transfer of messages and documents between the modular services in the system 100. In one embodiment, The MF 120 is implemented as a web service, a software system designed to support interoperable machine to machine interaction over a network, providing the interface by which an external process communicates with the system 100.

As described above, an external system, either a third party system or a service component, sends a DTS computer message to the MF 120 containing the document to be processed and the unique MF Message Type identifier. The database 190 includes defined lists of MF Message Type records of data, each of which describes the processing aspects of a specific MF Message Type. Each document, in the form of a computer message, processed by the MF will contain a message type identifier which uniquely identifies the message type.

Figure 10:
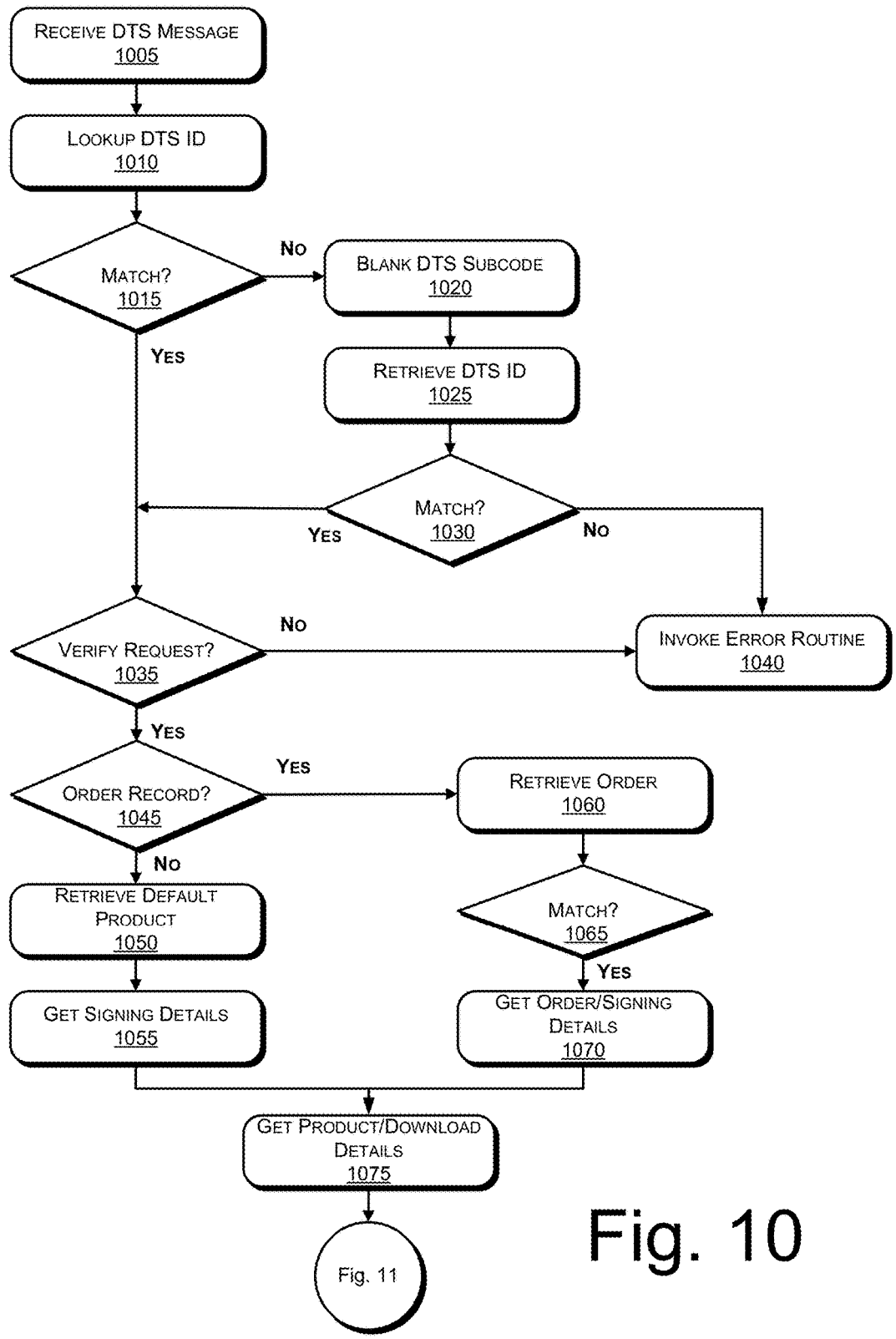
FIGS. 10-12 are flowcharts illustrating operations in a method of message processing, according to embodiments.
Figure 11:
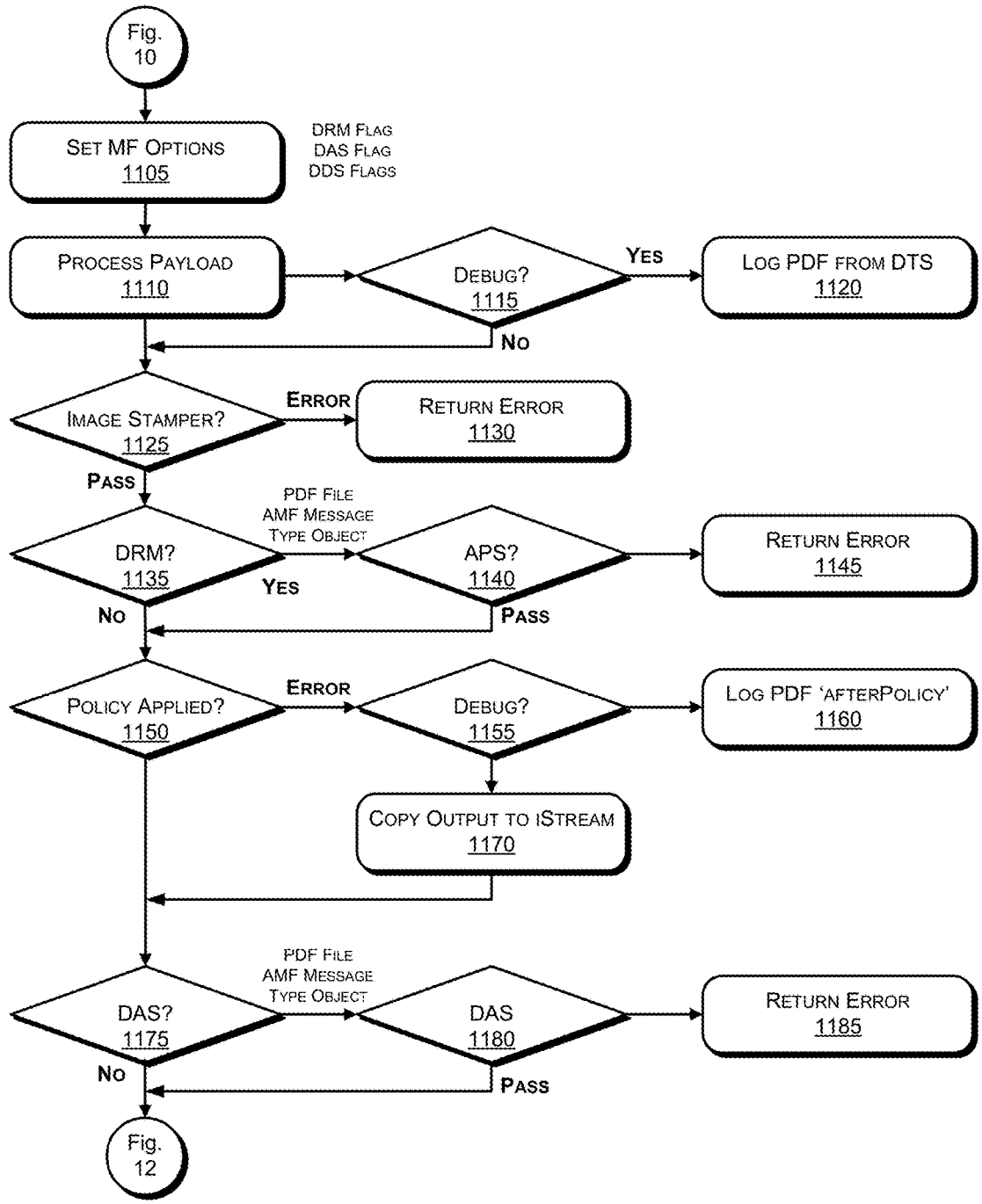
Figure 12:
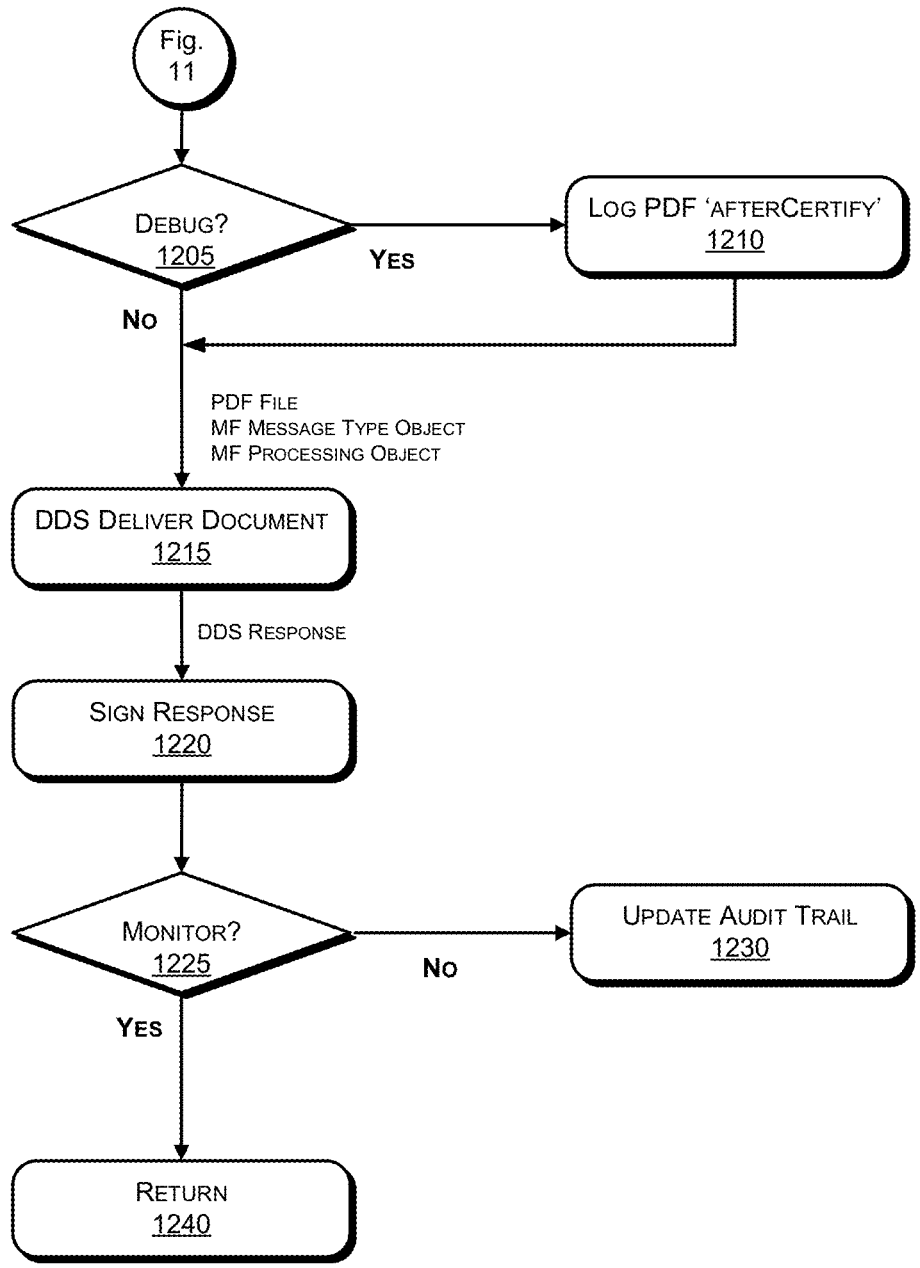

FIGS. 10-12 are flowcharts illustrating operations in a method of message processing, according to embodiments. Referring first to FIG. 10, the MF 120 receives a DTS message from an external system (operation 1010). Using the MF Message Type identifier (DTS Id) included in the DTS message, the MF 120 locates and retrieves the message type record in the database 190 (operation 1010). If at operation 1015, a matching message type record is not found, the MF 120 will attempt to match a subset of the DTS Id in the DTS Message with a default message type record (operation 1030). If a matching record is not found, then control passes to operation 1040 and an error routine is invoked. The "dts_source_public_key" value in the message type record is then used by the MF 120 to validate the input message at operation 1035. If the validation fails, then control is passed to operation 1040 and an error routine is invoked.

In some embodiments, the MF 120 is adapted to handle input DTS messages that originate from one of the internal system services modules (i.e., the DOS, DGS, PS) which may be continuations of existing Database Order Records or from external third party systems whereby the document is new and heretofore unknown to the system. The MF 120 accomplishes this by checking, at operation 1045 for the presence of a unique Order Record identifier in the input DTS Message. If the Order identifier is present, then control passes to operation 1060 and the MF 120 locates and retrieves (operation 1070) the Order record from the database 190 and uses the values contained in the record to populate the MF Processing Object (See Table 16). By contrast, if at operation 1045 the Order identifier is not present, the MF 120 will retrieve (operation 1050) the default values in the MF Message Type record to populate the MF Processing Object (operation 1055 and 1075). Control then passes to the operations depicted in FIG. 11, which are discussed below.

TABLE 16

MF Processing Object

| Object Member | Type | Description |
| --- | --- | --- |
| order_id | Integer | unique order record identifier |
| order_product_id | Integer | unique order document record identifier |
| products_id | Integer | unique document definition record identifier |
| products_name | String | document name |
| adds3_flag | Boolean | 0 - DAS processing is not enabled for document<br>1 - DAS processing enabled for document |
| adds4_flag | Boolean | 0 - DRM processing is not enabled for document<br>1 - DRM processing enabled for document |
| adds5_delivery_method | String | DDS delivery method for the document |
| adds5_delivery_email | String | DDS delivery email address |
| products_attributes_filename | String | DDS Delivery filename |
| products_attributes_maxdays | Integer | DDS Download expiration counter |
| products_attributes_maxcount | Integer | DDS Download counter |

In some embodiment, the MF 120 enables the MF Processing Object to be aggregated and to persist in a standardized format, the information required to process the document from the input DTS message. Thus the MF 120 is able to use a single computer logic routine to process documents from both internal service modules and external third party systems. FIG. 11 illustrates the operations in a routine that is used by the MF 120 to process all documents (i.e., DTS messages). At operation 1105, control is received from the operations depicted in FIG. 10 and the MF 120 processing flags are set. The MF extracts the PDF file containing the document from the payload of the input DTS message at operation 1110. At operation 1125, the MF uses values from the MF Message Type Object to determine if a certification graphic is to be applied to the document. If the graphic is to be applied, the MF uses additional values in the MF Message Type Object to control the placement of the graphic. At operation 1135, the MF will use values from the MF Message Processing Object to determine if the DRS is enabled for this document. If so, control will be passed to operation 1140 and the MF will send a computer message to the DRS containing the PDF file of the document to be protected and the MF Message Type Object. The DRS will include the PDF file of the policy protected document in the response to the input message. If an error is returned by operation 1140, control is passed to operation 1145 and an error routine is invoked. At operation 1175, the MF will then use values from the MF Message Processing Object to determine if the DAS is enabled for this document. If so, control will be passed to operation 1180 and the MF will send a computer message to the DAS containing the PDF file of the document to be certified and the MF Message Type Object. The DAS will include the PDF file of the certified document in the response to the input message. If an error is returned by operation 1180, control is passed to operation 1145 and an error routine is invoked. Control then passes to the operations depicted in FIG. 12, which are discussed below.

FIG. 12 illustrates the computer logic routine by which the MF sends an input message to the DDS containing the PDF File of the document to be delivered, the MF Message Type Object and the MF Processing Object (operation 1215). The DDS includes the delivery status in the response to the input message. Upon completion of the DDS at operation 1220, the MF will build and sign a properly formed DTS Response Message. Control is then passed to operation 1225 where the MF will save and audit record of the message in the database 190. Control is then passed to operation 1240, where the status is returned in the response to the input DTS message.

Management Console (MC)

System 100 includes a Management Console (MC) 175. In one embodiment, the MC is a web-based portal which may be used by an organization administrator to manage users, fulfill orders, configure the system and monitor the site for errors and issues. Using the MC 175, the administrator has a complete view as to the progress of an order through the various service modules of the system 100. Depending on the service modules that are deployed, the administrator will be able to view, search, download or print a list of all orders (documents) in the system. The administrator may use this view as a historical view into past orders. In addition, the administrator can monitor the status of current orders as they traverse the service modules, manage document requestor's authorization and consent to release a document, and maintain the configuration settings of the service modules.

While the MC provides many useful functions, the input and output messages to the MC are a data record that represents an order that was placed by the user of the system. This order is defined with the data elements listed in Table 1 (Order Data Elements).

Monitoring System (MS)

The MS 180 is a service tool that may be used by the system 100 to ensure that the system 100 is continually operational. Periodically, a test message is sent to the application and a response is required if the system is operational. If no response message is returned or an error condition is detected, then the systems will notify the system administrator via email and page that action must be taken.

Billing System (BS)

The Billing System (BS) 185 is used by the host and end user administrators to monitor, create and adjust billing information. It is also used to publish billing statements to system end users. The BS 185 comprises four components: 1) Contract Setup, 2) Bill Generator, 3) Billing Cycle, 4) Billing Statement.

There are seven screens associated with the BS: 1) Contract Summary Screen, 2) Contract Detail Screen, 3) Bill Generator Screen, 4) CC Import Data Screen, 5) Bill Cycle Summary Screen, 6) Bill Cycle Detail Screen, 7) Billing Statement Screen.

The BS 185 operates on orders that have been stored in the database 190. The unique capabilities embodied in the BS 185 involve counting order transactions associated with multiple clients, contracts, billing periods and system component configurations and determining the fees to be charged to the client based on these calculations. The process involves complex counting and sorting of these transactions counts and fees and displaying them to the end user in a logical manner.

Thus, the system described herein enables the electronic management and delivery of electronic documents in a fully-integrated, secure environment. Some of the operations described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and embodiments are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and embodiments are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and embodiments are not limited in this respect.

In the description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one embodiment" "some embodiments" or "an embodiment" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A system to manage and deliver electronic documents, comprising:
    a document ordering module comprising logic to generate elements of an order record from a document order input to the document ordering module;
    a database coupled to the document ordering module comprising logic to store at least a portion of the order record generated by the document ordering module;
    a messaging framework coupled to the document ordering module and the database;
    a document generation service module coupled to the messaging framework and comprising logic to receive a requestor identifier, generate an electronic document from data retrieved from a client data center based on the order record and the requestor identifier, and further comprising logic to pass the electronic document to the messaging framework;
    a document authentication service module comprising logic to apply a digital certificate to the electronic document prior to passing the electronic document to the messaging framework;
    computational machinery configured to execute logic instructions via a processor, comprising:
    a storage configured to store the electronic document; and
    a secure portal service to retrieve or deliver the electronic document.

2. The system of claim 1, wherein the secure portal service is configured to allow a user to manually submit an electronic document to the messaging framework.

3. The system of claim 2, wherein the secure portal service is configured to send a message to one or more recipients and provide:
    a secure location of the electronic document;
    a unique identifier associated with the electronic document; and
    authorization to securely download the document.

4. The system of claim 1, wherein the document generation service module coupled to the messaging framework further comprises logic to apply a certification graphic to the electronic document.

5. The system of claim 1, further comprising a document delivery service module configured to communicate with the messaging framework and comprising logic to:
    retrieve an order or request for the electronic document;
    assign a unique name for the electronic document; and
    deliver the electronic document to the requestor.

6. The system of claim 1 wherein the electronic document is published to a secure web site and a link is generated for accessing the secure web site.

7. The system of claim 6 wherein accessing the secure web site requires authentication by a requestor associated with the requestor identifier.

8. The system of claim 7 wherein the requestor may request and access multiple electronic documents managed by the system from the secure web site by providing the authentication.

9. A system for managing and delivering a secure electronic document, comprising:
- a document ordering module comprising logic to collect personal data related to an individual and generate an order record from a document order input;
- a messaging framework coupled to the document ordering module and at least one client data center;
- a document generation service module comprising logic to receive a requestor identifier, retrieve data from the at least one client data center based on the order record and the requestor identifier, generate a secure electronic document from the data retrieved from the at least one client data center, and pass the secure electronic document to the messaging framework;
- computational machinery comprising a processor and configured to execute logic instructions via the processor; and
- a document delivery service module comprising logic to:
    - authenticate the data retrieved and included in the secure electronic document;
    - approve the generated secure electronic document; and
    - securely deliver the secure electronic document to a third party.

10. The system of claim 9 further comprising a portal service, wherein a plurality of secure electronic documents generated by the document generation service module may be stored by the portal service, and wherein one or more secure electronic documents may be retrieved by the messaging framework and passed to the document delivery service module.

11. The system of claim 10, wherein the document delivery service module authenticates and obtains approval for the one or more secure electronic documents prior to delivering the one or more secure electronic documents to a third party.

12. The system of claim 9, wherein the secure electronic document is selected from the list comprising a credential, a transcript, a diploma, an award, a certificate, a letter, a medical record, and a financial record.

13. The system of claim 10 wherein the portal service comprises logic to send a message to one or more potential recipients of the secure electronic document and provide:
- a secure location of the secure electronic document;
- a unique identifier associated with the secure electronic document; and
- authorization to securely download the secure electronic document.

14. The system of claim 13, wherein the portal service comprises logic to allow a user to manually submit a secure electronic document to the messaging framework.

15. The system of claim 9 further comprising a document authentication service module comprising logic to apply a digital certificate to the secure electronic document prior to passing the secure electronic document to the messaging framework.

16. The system of claim 9, wherein the secure electronic document is published to a secure web site and a link is generated for accessing the secure web site.

17. The system of claim 16 wherein accessing the secure web site requires authentication by a requestor of the secure electronic document associated with the requestor identifier.

18. The system of claim 16 wherein a requestor associated with the requestor identifier may request and access multiple secure electronic documents managed by the system from the secure web site.

* * * * *